US008210990B2

(12) United States Patent
Yoshioka et al.

(10) Patent No.: US 8,210,990 B2
(45) Date of Patent: Jul. 3, 2012

(54) HYDRAULIC CONTROL DEVICE FOR MULTI-SPEED AUTOMATIC TRANSMISSION

(75) Inventors: Yuhei Yoshioka, Anjo (JP); Kazuyuki Noda, Anjo (JP); Naoki Itazu, Toyota (JP); Yoshinobu Nozaki, Toyota (JP)

(73) Assignees: Aisin Aw Co., Ltd., Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 365 days.

(21) Appl. No.: 12/561,742

(22) Filed: Sep. 17, 2009

(65) Prior Publication Data

US 2010/0081546 A1 Apr. 1, 2010

(30) Foreign Application Priority Data

Sep. 30, 2008 (JP) ................................ 2008-255842

(51) Int. Cl.
 *F16H 61/26* (2006.01)
(52) U.S. Cl. ......... 477/130; 477/160; 477/163; 477/164
(58) Field of Classification Search .................. 477/127, 477/130, 131, 160, 161, 163, 164
 See application file for complete search history.

(56) References Cited

U.S. PATENT DOCUMENTS

| 6,527,670 | B1 | 3/2003 | Gierer et al. | |
| 2001/0009880 | A1* | 7/2001 | Suzuki et al. | 475/122 |
| 2002/0025884 | A1* | 2/2002 | Suzuki et al. | 477/127 |
| 2003/0022749 | A1* | 1/2003 | Itou et al. | 475/65 |
| 2007/0161448 | A1 | 7/2007 | Sato et al. | |
| 2007/0161449 | A1 | 7/2007 | Hayashi et al. | |
| 2007/0167283 | A1 | 7/2007 | Sato et al. | |
| 2010/0082209 | A1* | 4/2010 | Yoshioka et al. | 701/62 |

FOREIGN PATENT DOCUMENTS

| DE | 198 58 543 A1 | 6/2000 |
| JP | 2007-177932 A | 7/2007 |
| JP | 2007-177933 A | 7/2007 |
| JP | 2007-177934 A | 7/2007 |

* cited by examiner

*Primary Examiner* — Ha D. Ho
(74) *Attorney, Agent, or Firm* — Sughrue Mion, PLLC

(57) ABSTRACT

A hydraulic control device for a multi-speed automatic transmission includes friction engagement elements, several hydraulic servos that engage and release the friction engagement elements, solenoid valves for engagement control, and a sorting switch valve that allocates engagement pressure from at least one of the solenoid valves for engagement control to two of the hydraulic servos. The sorting switch is switched between a first position that supplies engagement pressure to one of the two hydraulic servos in at least a Reverse, non-drive range and a specific Forward gear range, and a second position that supplies engagement pressure to the two hydraulic servos in other than the Forward range. The hydraulic control device supplies the engagement pressure to the two hydraulic servos when an all-solenoids-off failure occurs and the sorting switch is in the second position, and cuts off a source pressure to all solenoid valves when an all-solenoids-off failure occurs while the sorting switch valve is in the first position.

7 Claims, 10 Drawing Sheets

FIG. 2

|   | C-1 | C-2 | C-3 | C-4 | B-1 | B-2 | F-1 |
|---|---|---|---|---|---|---|---|
| P |  |  |  |  |  |  |  |
| REV |  |  |  | ◯ |  | ◯ |  |
| N |  |  |  |  |  |  |  |
| 1ST | ◯ |  |  |  |  | (◯) | ◯ |
| 2ND | ◯ |  |  |  | ◯ |  |  |
| 3RD | ◯ |  | ◯ |  |  |  |  |
| 4TH | ◯ |  |  | ◯ |  |  |  |
| 5TH | ◯ | ◯ |  |  |  |  |  |
| 6TH |  | ◯ |  | ◯ |  |  |  |
| 7TH |  | ◯ | ◯ |  |  |  |  |
| 8TH |  | ◯ |  |  | ◯ |  |  |

(◯): ENGINE BRAKE IN USE

FIG. 4

| RANGE | | ON/OFF SOLENOID | | | LINEAR SOLENOID | | | | |
|---|---|---|---|---|---|---|---|---|---|
| | | S1 N/C | S2 N/C | S3 N/O | SL1 N/C | SL2 N/C | SL3 N/C | SL4 N/C | SL5 N/C |
| P | | × | ○ | ○ | × | × | × | × | × |
| R | | ○ | × | ○ | × | ○ | × | ○ | × |
| N | | ○ | × | ○ | × | × | × | × | × |
| D | 1ST | × | × | ○ | ○ | ○ | × | × | × |
| | 1st E/B | ○ | × | ○ | ○ | × | × | × | × |
| | 2ND | × | × | ○ | ○ | ○ | × | × | ○ |
| | 3RD | × | × | ○ | ○ | × | ○ | × | × |
| | 4TH | × | × | ○ | ○ | × | × | ○ | × |
| | 5TH | × | × | ○ | × | ○ | × | × | × |
| | 6TH | × | × | ○ | × | ○ | × | ○ | × |
| | 7TH | × | × | ○ | × | ○ | ○ | × | × |
| | 8TH | × | × | ○ | × | ○ | × | × | ○ |

F I G . 6
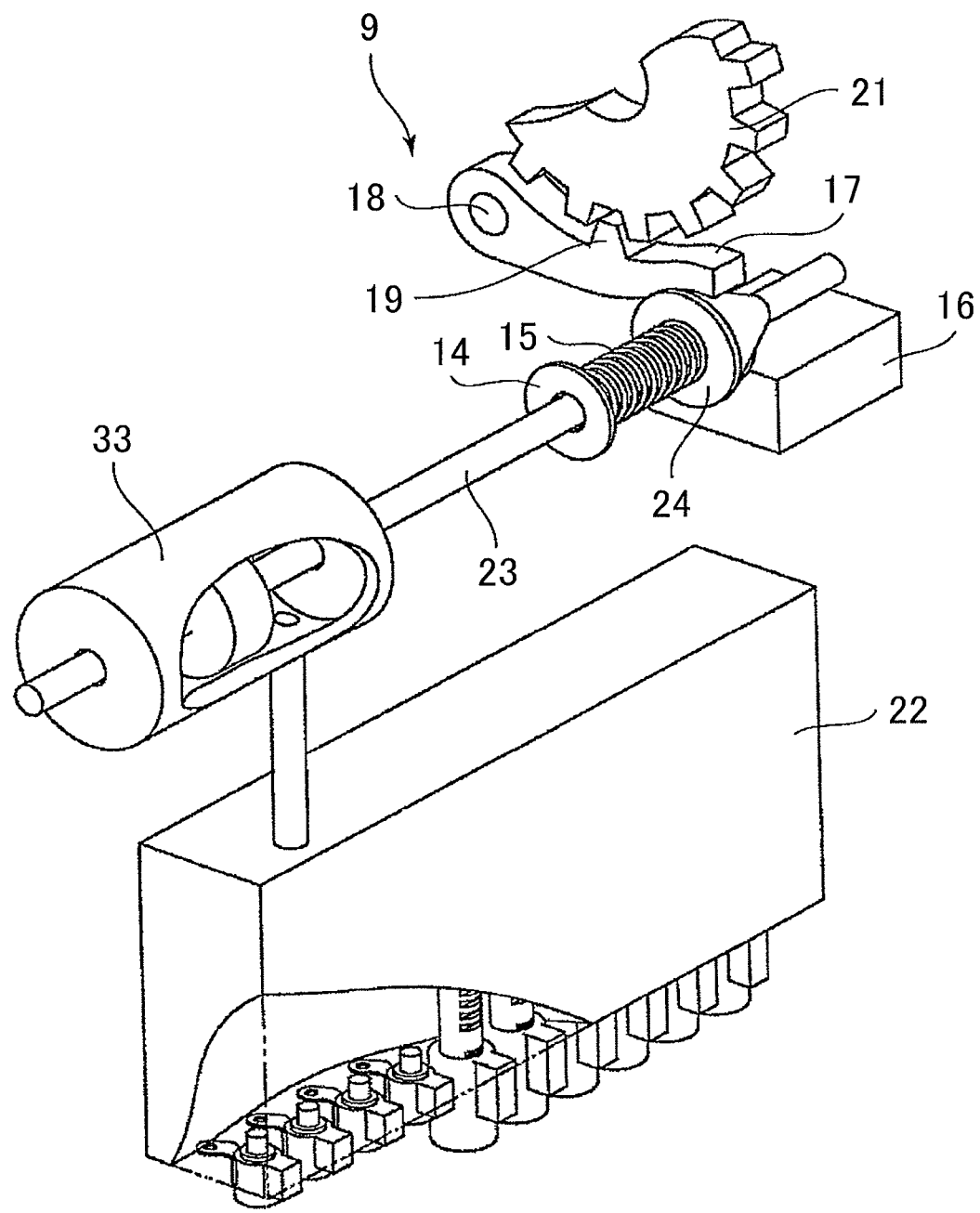

FIG. 8

| RANGE | | ON/OFF SOLENOID | | | LINEAR SOLENOID | | | | |
|---|---|---|---|---|---|---|---|---|---|
| | | S1 N/C | S2 N/C | S3 N/O | SL1 N/C | SL2 N/O | SL3 N/O | SL4 N/C | SL5 N/C |
| P | | × | ○ | ○ | × | ○ | ○ | × | × |
| R | | ○ | × | ○ | × | × | ○ | ○ | × |
| N | | ○ | × | ○ | × | ○ | ○ | × | × |
| D | 1ST | × | × | ○ | ○ | ○ | ○ | × | × |
| | 1st E/B | ○ | × | ○ | ○ | × | ○ | × | × |
| | 2ND | × | × | ○ | ○ | ○ | ○ | × | ○ |
| | 3RD | × | × | ○ | ○ | × | × | × | × |
| | 4TH | × | × | ○ | × | × | ○ | ○ | × |
| | 5TH | × | × | ○ | × | ○ | ○ | × | × |
| | 6TH | × | × | ○ | × | ○ | ○ | ○ | × |
| | 7TH | × | × | ○ | × | × | × | × | × |
| | 8TH | × | × | ○ | × | × | ○ | × | ○ |

FIG. 10

| RANGE | | ON/OFF SOLENOID | | | LINEAR SOLENOID | | | | |
|---|---|---|---|---|---|---|---|---|---|
| | | S1 N/C | S2 N/C | S3 N/O | SL1 N/C | SL2 N/O | SL3 N/O | SL4 N/C | SL5 N/C |
| P | | × | ○ | ○ | × | ○ | ○ | × | × |
| R | | ○ | × | ○ | × | × | ○ | ○ | × |
| N | | ○ | × | ○ | × | ○ | ○ | × | × |
| D | 1ST | × | × | ○ | ○ | ○ | ○ | × | × |
| | 1st E/B | ○ | × | ○ | ○ | × | ○ | × | × |
| | 2ND | × | × | ○ | ○ | ○ | ○ | × | ○ |
| | 3RD | × | × | ○ | ○ | ○ | × | × | × |
| | 4TH | × | × | ○ | × | × | ○ | ○ | × |
| | 5TH | × | × | ○ | × | × | ○ | × | × |
| | 6TH | × | × | ○ | × | × | ○ | ○ | × |
| | 7TH | × | × | ○ | × | × | × | × | × |
| | 8TH | × | × | ○ | × | × | ○ | × | ○ |

HYDRAULIC CONTROL DEVICE FOR MULTI-SPEED AUTOMATIC TRANSMISSION

INCORPORATION BY REFERENCE

The disclosure of Japanese Patent Application No. 2008-255842 filed on Sep. 30, 2008 including the specification, drawings and abstract is incorporated herein by reference in its entirety.

BACKGROUND OF THE INVENTION

The present invention relates to a hydraulic control device for a multi-speed automatic transmission that may be mounted in a vehicle, and more specifically relates to a hydraulic control device for a multi-speed automatic transmission that at least in a reverse range, a non-drive range, and a specific gear speed does not switch to a predetermined forward gear speed when an all-solenoids-off failure mode occurs.

Description Of The Related Art

Given improvements to the output performance of linear solenoid valves, hydraulic control devices for automatic transmissions in recent years have been configured so as to directly supply an engagement pressure regulated by the linear solenoid valve to a hydraulic servo of a clutch or brake. Using a normally-open (N/O) type of linear solenoid valve increases the power consumed by the clutch or brake that corresponds to the linear solenoid valve when not engaged, and becomes an obstacle to improving vehicle fuel efficiency. For this reason, a normally-closed (N/C) type of linear solenoid valve is preferred.

If none of the solenoid valves including the above linear solenoid valve are supplied with power due to a short-circuit in wiring or a control computer (ECU) shutdown, namely in the event of an all-solenoids-off failure, the normally-closed solenoid valve will not output hydraulic pressure, which means that the engagement pressure cannot be supplied to the hydraulic servo. In particular, if an all-solenoids-off failure occurs during travel, the automatic transmission will not be able to form a gear and will switch to the neutral range.

Hence, a hydraulic control device formed with a normally-closed type of linear solenoid valve that reversely inputs hydraulic pressure from an exhaust port of a specific linear solenoid valve has been proposed (see Japanese Patent Application Publication No. JP-A-2007-177932 for an example). This hydraulic control device is configured such that in the event of an all-solenoids-off failure during travel, a forward range pressure is reversely input to exhaust ports of linear solenoid valves SLC2 and SLC3, which are respectively connected to a second clutch C-2 and a third clutch C-3 that foam a forward seventh gear speed. The hydraulic control device thus achieves improved fuel efficiency under normal conditions and also achieves a fail-safe function by forming the forward seventh gear speed if a failure occurs.

SUMMARY OF THE INVENTION

In the hydraulic control device described in Japanese Patent Application Publication No. JP-A-2007-177932 above, a manual shift valve that is linked to the operation of a shift lever is used to switch among a P range, R range, N range, D range and the like. Recently, however, there is an another type of hydraulic control device that incorporates a so-called shift-by-wire system, which eliminates the manual shift valve and instead uses a plurality of solenoid valves or switching valves to switch the range of the automatic transmission with a hydraulic pressure setting that is based on an electrical command.

Based on this type of shift-by-wire system, however, many solenoid valves and switching valves are required to achieve a configuration that switches among the P range, R range, N range, D range and the like in a manner similar to the conventional manual shift valve, which is not realistic from the standpoints of manufacturing cost and device size. Therefore, when using the shift-by-wire system, a configuration may be employed that simply supplies and blocks a range pressure (a line pressure) that is fed to the linear solenoid valve.

However, if a shift-by-wire system that simply supplies and blocks the range pressure in this manner is used in a hydraulic control device that performs a failsafe measure through reverse input of the linear solenoid valve as mentioned above, the linear solenoid valve is subject to reverse input regardless of which range, i.e., the P range, R range, N range and D range, is used. Consequently, a forward seventh gear speed is formed when a range other than the D range is in use. Thus, the shift-by-wire system cannot be adopted in the above hydraulic control device without modification.

Hence, the present invention provides a hydraulic control device for a multi-speed automatic transmission that secures travel by shifting to a predetermined forward gear speed when an all-solenoids-off failure mode occurs during travel in a forward gear speed other than a specific gear speed, without using a manual shift valve and without further increasing a number of valves. The present invention further provides a hydraulic control device for a multi-speed automatic transmission that is configured such that a shift is surely not made to the predetermined forward gear speed if an all-solenoids-off failure mode occurs in a P, R, or N range and a specific gear speed.

The present invention is a hydraulic control device for a multi-speed automatic transmission that includes a plurality of friction engagement elements; a plurality of hydraulic servos that engages and releases the plurality of friction engagement elements; a plurality of solenoid valves for engagement control that is at least one less than the plurality of hydraulic servos; and a sorting switch valve that allocates an engagement pressure from at least one of the plurality of solenoid valves for engagement control to two among the plurality of hydraulic servos. The sorting switch valve takes a first position (left half position) that can supply the engagement pressure to one of the two hydraulic servos in at least a reverse (R) range, a non-drive (P, N) range, and a specific gear speed of a forward range (e.g. engine braking in a first forward speed), and takes a second position (right half position) that can supply the engagement pressure to another of the two hydraulic servos in other than the forward range (first to eighth forward speeds). The hydraulic control device achieves a first state that can form gear speeds using the solenoid valves for engagement control; a second state that supplies the engagement pressure to two among the plurality of hydraulic servos through two among the plurality of solenoid valves for engagement control when an all-solenoids-off failure occurs; and a third state that cuts off a source pressure to all the solenoid valves for engagement control when an all-solenoids-off failure occurs. The hydraulic control device also includes a state variable oil passage that passes through the sorting switch valve and modifies the second state and the third state depending on a pressure output state. The second state is achieved when an all-solenoids-off failure occurs while the sorting switch valve is in a second position (right half position), and the third state is achieved when all-solenoids-off failure occurs while the sorting switch valve is in a first position (left half position).

In this case, the second state is achieved when an all-solenoids-off failure mode occurs while the sorting switch valve is in the second position (the right half position), and the third state is achieved when an all-solenoids-off failure mode occurs while the sorting switch valve is in the first position (the left half position). Therefore, a sorting switch valve can be used that allocates the engagement pressure from at least one of the solenoid valves for engagement control to the two hydraulic servos, and configured such that a state variable oil passage passes through the sorting switch valve. Consequently, a manual shift valve is not used, and the number of valves is reduced. Furthermore, travel can be secured that shifts to the predetermined forward gear speed using the two hydraulic servos if the all-solenoids-off failure mode occurs while running in a forward gear speed, excluding engine braking in the first forward speed. Also, if the all-solenoids-off failure mode occurs in the reverse range, the non-drive range, or a specific gear speed, the source pressure is cut off from all the solenoid valves for engagement control so that the automatic transmission does not shift to the predetermined forward gear speed. Therefore, for example, the N range is switched to if in the reverse range; the P range or the N range is switched to if in the non-drive range; and the N range is switched to if in the specific gear speed. Consequently, it is possible to reliably prevent a problem such as switching to a driving state unintended by the driver and losing the driver's trust.

Specifically, the present invention includes: a source pressure switch valve that switches between a supply position (the left half position) that supplies the source pressure to the plurality of solenoid valves for engagement control, and a reverse input position (the right half position) that inputs a reverse input pressure to exhaust ports of the two solenoid valves for engagement control through the sorting switch valve; and a signal pressure output solenoid valve that outputs a signal pressure, which switches the source pressure switch valve to the reverse input position (the right half position) when an all-solenoids-off failure occurs. The state variable oil passage is formed from a reverse input oil passage that passes through the sorting switch valve from the source pressure switch valve, and communicates the reverse input pressure to the exhaust ports of the two solenoid valves for engagement control. The sorting switch valve communicates with the reverse input oil passage when in the second position (the right half position), and blocks the reverse input oil passage when in the first position (the left half position).

Accordingly, by switching the sorting switch valve, which allocates the engagement pressure from at least one solenoid valve for engagement control to two hydraulic servos, between the second position and the first position, it is possible to reliably switch between the open and closed states of the reverse input oil passage. Consequently, the number of valves can be reduced, and travel can be secured that shifts to the predetermined forward gear speed using the two hydraulic servos if the all-solenoids-off failure mode occurs while running in a forward gear speed, excluding engine braking in the first forward speed. Also, if the all-solenoids-off failure mode occurs in the P range, R range, N range, or the specific gear speed, the source pressure is completely cut off from all the solenoid valves for engagement control so that the automatic transmission does not shift to the predetermined forward gear speed. Thus, a function that can form the predetermined forward gear speed and a range other than the predetermined forward gear speed in the event of an all-solenoids-off failure can be achieved by the source pressure switch valve and the sorting switch valve without increasing the number of valves, and the hydraulic circuit configuration can be simplified.

The present invention includes: a source pressure switch valve that switches between a supply position (a left half position) that supplies the source pressure to the plurality of solenoid valves for engagement control, and a cut-off position (a right half position) that cuts off the source pressure; and a signal pressure output solenoid valve that outputs a signal pressure that switches the source pressure switch valve to the cut-off position (the right half position) when an all-solenoids-off failure occurs. The state variable oil passage is formed from a signal pressure passage that passes through the sorting switch valve from the signal pressure output solenoid valve and communicates the signal pressure to the source pressure switch valve. The sorting switch valve blocks the signal pressure oil passage when in the second position (the right half position), and communicates with the signal pressure oil passage when in the first position (the left half position).

Accordingly, by switching the sorting switch valve, which allocates the engagement pressure from at least one solenoid valve for engagement control to two hydraulic servos, between the second position and the first position, it is possible to reliably switch between the open and closed states of the signal pressure oil passage. Consequently, the number of valves can be reduced, and travel can be secured that shifts to the predetermined forward gear speed using the two hydraulic servos if the all-solenoids-off failure mode occurs while running in a forward gear speed, excluding engine braking in the first forward speed. Also, if the all-solenoids-off failure mode occurs in the P range, R range, N range, or the specific gear speed, the source pressure is completely cut off from all the solenoid valves for engagement control so that the automatic transmission does not shift to the predetermined forward gear speed. Thus, a function that can form the predetermined forward gear speed and a range other than the predetermined forward gear speed in the event of an all-solenoids-off failure can be achieved by the source pressure switch valve and the sorting switch valve without increasing the number of valves, and the hydraulic circuit configuration can be simplified.

Specifically, in the present invention, the sorting switch valve includes a biasing mechanism that biases a spool so as to take the first position (the left half position); a forward engagement pressure input oil chamber that is input with the engagement pressure, which is supplied to the hydraulic servo of the friction engagement element that is engaged during forward travel, and switches the spool to the second position (the right half position) against the biasing force of the biasing mechanism; a second lock pressure input oil chamber that is input with a lock pressure when in the second position (the right half position) to lock the spool in the second position (the right half position); and a lock release pressure input oil chamber that is input with a lock release pressure that returns the spool locked in the second position (the right half position) to the first position (the left half position). When the source pressure is stopped, the biasing force of the biasing mechanism returns the spool to the first position (the left half position).

In this case, a simple configuration is achieved where the lock pressure is input to the forward engagement pressure input oil chamber, and the lock release pressure is input to the lock release pressure input oil chamber. Therefore, when engine driving is stopped and the source pressure also stopped, the biasing force of the biasing mechanism can return the spool to the first position. Consequently, a hydraulic circuit with a simple configuration can be achieved for a more compact hydraulic control device.

Specifically, the present invention includes: a source pressure switch valve that switches between a supply position (the left half position) that supplies the source pressure to the plurality of solenoid valves for engagement control and a cut-off position (the right half position) that cuts off the source pressure, and has a first lock pressure input oil chamber that is input with a lock pressure to lock the source pressure switch valve to the supply position (the left half position); and a signal pressure output solenoid valve that outputs a signal pressure, which switches the source pressure switch valve to the cut-off position (the right half position) when an all-solenoids-off failure occurs. The sorting switch valve has a second lock pressure input oil chamber that is input with the lock pressure when in the second position (the right half position) to lock the sorting switch valve in the second position (the right half position). The state variable oil passage is formed from a lock pressure oil passage that communicates the lock pressure to the first lock pressure input oil chamber of the source pressure switch valve through the second lock pressure input oil chamber of the sorting switch valve. The sorting switch valve communicates with the lock pressure oil passage when in the second position (the right half position), and blocks the lock pressure oil passage when in the first position (the left half position).

Accordingly, by switching the sorting switch valve, which allocates the engagement pressure from at least one solenoid valve for engagement control to two hydraulic servos, between the second position and the first position, it is possible to reliably switch between the open and closed states of the lock pressure oil passage. Consequently, the number of valves can be reduced, and travel can be secured that shifts to the predetermined forward gear speed using the two hydraulic servos if the all-solenoids-off failure mode occurs while running in a forward gear speed, excluding engine braking in the first forward speed. Also, if the all-solenoids-off failure mode occurs in the P range, R range, N range, or the specific gear speed, the source pressure is completely cut off from all the solenoid valves for engagement control so that the automatic transmission does not shift to the predetermined forward gear speed. Thus, a function that can form the predetermined forward gear speed and a range other than the predetermined forward gear speed in the event of an all-solenoids-off failure can be achieved by the source pressure switch valve and the sorting switch valve without increasing the number of valves, and the hydraulic circuit configuration can be simplified.

In the present invention, the sorting switch valve includes a biasing mechanism that biases a spool so as to take the first position (the left half position); a forward engagement pressure input oil chamber that is input with the engagement pressure, which is supplied to the hydraulic servo of the friction engagement element that is engaged during forward travel, and switches the spool to the second position (the right half position) against the biasing force of the biasing mechanism; and a lock release pressure input oil chamber that is input with a lock release pressure that returns the spool locked in the second position (the right half position) to the first position (the left half position). When the source pressure is stopped, the biasing force of the biasing mechanism returns the spool to the first position (the left half position).

In this case, a simple configuration is achieved where the engagement pressure is input to the forward engagement pressure input oil chamber, and the lock release pressure is input to the lock release pressure input oil chamber. Therefore, when engine driving is stopped and the source pressure also stopped, the biasing force of the biasing mechanism can return the spool to the first position. Consequently, a hydraulic circuit with a simple configuration can be achieved for a more compact hydraulic control device.

In addition, the present invention includes: a parking switch valve that is switched between a parking state in which the source pressure is cut off from a parking cylinder in a park (P) range of the non-drive range, and a parking release state in which the source pressure is supplied to the parking cylinder in other than the park range, and is held in the switched position; a non-release signal pressure output solenoid valve that outputs to the parking switch valve a switch signal pressure that switches the parking release state to the parking state; and a release signal pressure output solenoid valve that outputs to the parking switch valve a switch signal pressure that switches the parking state to the parking release state. The signal pressure of the release signal pressure output solenoid valve is also used in combination as the lock release pressure for the sorting switch valve.

In this case, the present invention includes: a parking switch valve that is switched between a parking state in which the source pressure is cut off from a parking cylinder in a park range of the non-drive range, and a parking release state in which the source pressure is supplied to the parking cylinder in other than the park range, and is held in the switched position; a non-release signal pressure output solenoid valve that outputs to the parking switch valve a switch signal pressure that switches the parking release state to the parking state; and a release signal pressure output solenoid valve that outputs to the parking switch valve a switch signal pressure that switches the parking state to the parking release state. The signal pressure of the release signal pressure output solenoid valve is also used in combination as the lock release pressure for the sorting switch valve. Therefore, an exclusive solenoid valve for switching the sorting switch valve is not necessary. This further reduces the number of solenoid valves used in the hydraulic circuit, thus promoting simplification of the hydraulic circuit configuration.

BRIEF DESCRIPTION OF THE DRAWINGS

FIG. 2 is an operation chart for the automatic transmission.

FIG. 4 is an operation chart for a first embodiment according to the present invention.

FIG. 6 is a diagram that shows a parking device.

FIG. 8 is an operation chart for the second embodiment according to the present invention.

FIG. 10 is an operation chart for the third embodiment according to the present invention.

DETAILED DESCRIPTION OF THE EMBODIMENTS

Embodiments of the present invention will be described below with reference to FIGS. 1 to 10.

Configuration of Automatic Transmission

Figure 1:
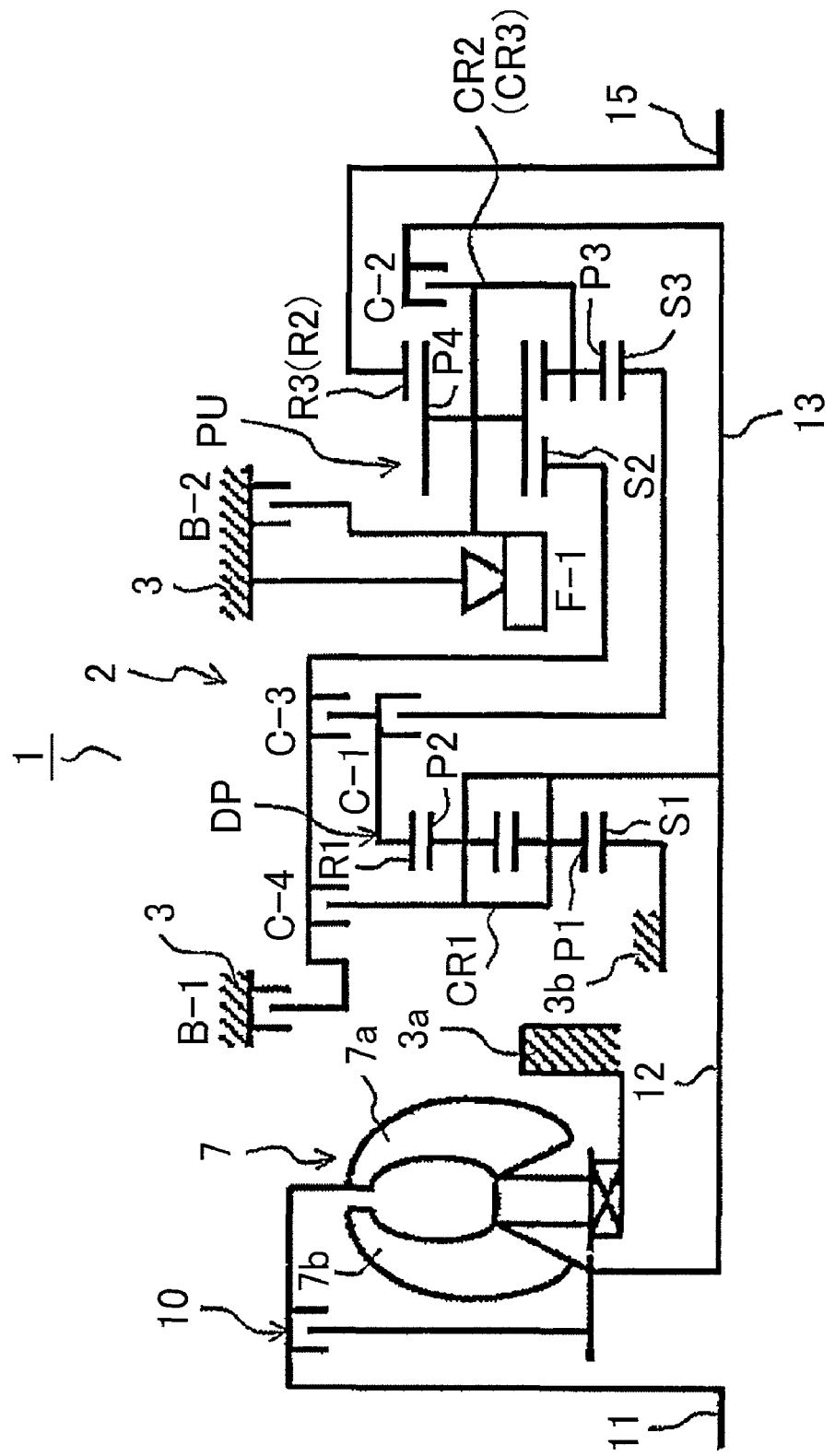
FIG. 1 is a skeleton diagram that shows an automatic transmission to which the present invention is applicable.

First, a schematic configuration of a multi-speed automatic transmission 1 (hereinafter referred to simply as an "automatic transmission") to which the present invention may be adapted will be described with reference to FIG. 1. As illustrated in FIG. 1, the automatic transmission 1 is well suited for use in a front-engine, rear-wheel-drive (FR) vehicle, and has an input shaft 11 whereby the automatic transmission 1 can be connected to an engine (not shown). A torque converter 7 and a speed change mechanism 2 are also provided centered around the axial direction of the input shaft 11.

The torque converter 7 has a pump impeller 7a that is connected to the input shaft 11 of the automatic transmission 1, and a turbine runner 7b to which the rotation of the pump impeller 7a is transmitted via a working fluid. The turbine runner 7b is connected to an input shaft 12 of the speed change mechanism 2, which is coaxially disposed with the input shaft 11. Also, the torque converter 7 is provided with a lock-up clutch 10. Engagement of the lock-up clutch 10 by a hydraulic control of a hydraulic control device described later directly transmits the rotation of the input shaft 11 of the automatic transmission 1 to the input shaft 12 of the speed change mechanism 2.

The speed change mechanism 2 is provided with a planetary gear DP and a planetary gear unit PU, which are both on the input shaft 12 (and an intermediate shaft 13). The planetary gear DP is a so-called double pinion planetary gear, which is provided with a sun gear 51, a carrier CR1, and a ring gear R1, wherein the carrier CR1 meshes with both a pinion P1 that meshes with the sun gear S1 and a pinion P2 that meshes with the ring gear R1.

Meanwhile, the planetary gear unit PU is a so-called Ravigneaux type planetary gear, which is provided with the four rotational elements of a sun gear S2, a sun gear S3, a carrier CR2 (CR3), and a ring gear R3 (R2), wherein the carrier CR2 meshes with both a long pinion P4 that meshes with the sun gear S2 and the ring gear R3, and a short pinion P3 that meshes with the long pinion P4 and the sun gear S3.

The sun gear S1 of the planetary gear DP is connected to and held stationary by a boss portion 3b that is integratedly fixed with a transmission case 3, for example. The boss portion 3b is provided extending from an oil pump body 3a. The first carrier CR1 is connected to the input shaft 12 and rotates together with the rotation of the input shaft 12 (hereinafter called the "input rotation"). The first carrier CR1 is also connected to a fourth clutch C-4 (a friction engagement element). The stationary sun gear S1 and the input rotation of the carrier CR1 cause the ring gear R1 to do deceleration rotation that decelerates the input rotation. The ring gear R1 is also connected to a first clutch C-1 (a friction engagement element) and a third clutch C-3 (a friction engagement element).

The sun gear S2 of the planetary gear unit PU is connected to a first brake B-1 (a friction engagement element) serving as a locking mechanism and is stationary in relation to the transmission case 3. The sun gear S2 is also connected to the fourth clutch C-4 and the third clutch C-3. The input rotation of the carrier CR1 through the fourth clutch C-4 and the deceleration rotation of the ring gear R1 through the third clutch C-3 are input to the sun gear S2. The sun gear S3 is connected to the first clutch C-1, and the deceleration rotation of the ring gear R1 is input to the sun gear S3.

The carrier CR2 is connected to a second clutch C-2 (a friction engagement element) into which the rotation of the input shaft 12 is input via the intermediate shaft 13, and through which the input rotation is input to the carrier CR2. The carrier CR2 is also connected to a one-way clutch F-1 serving as a locking mechanism and a second brake B-2 (a friction engagement element). The rotation that is input is restricted by the one-way clutch F-1 to rotation in one direction in relation to the transmission case 2, and the rotation that is input is made stationary by the second brake B-2. The ring gear R3 is connected to an output shaft 15 that outputs the rotation to a drive wheel (not shown).

Transmission Paths of Gear Speeds

Figure 3:
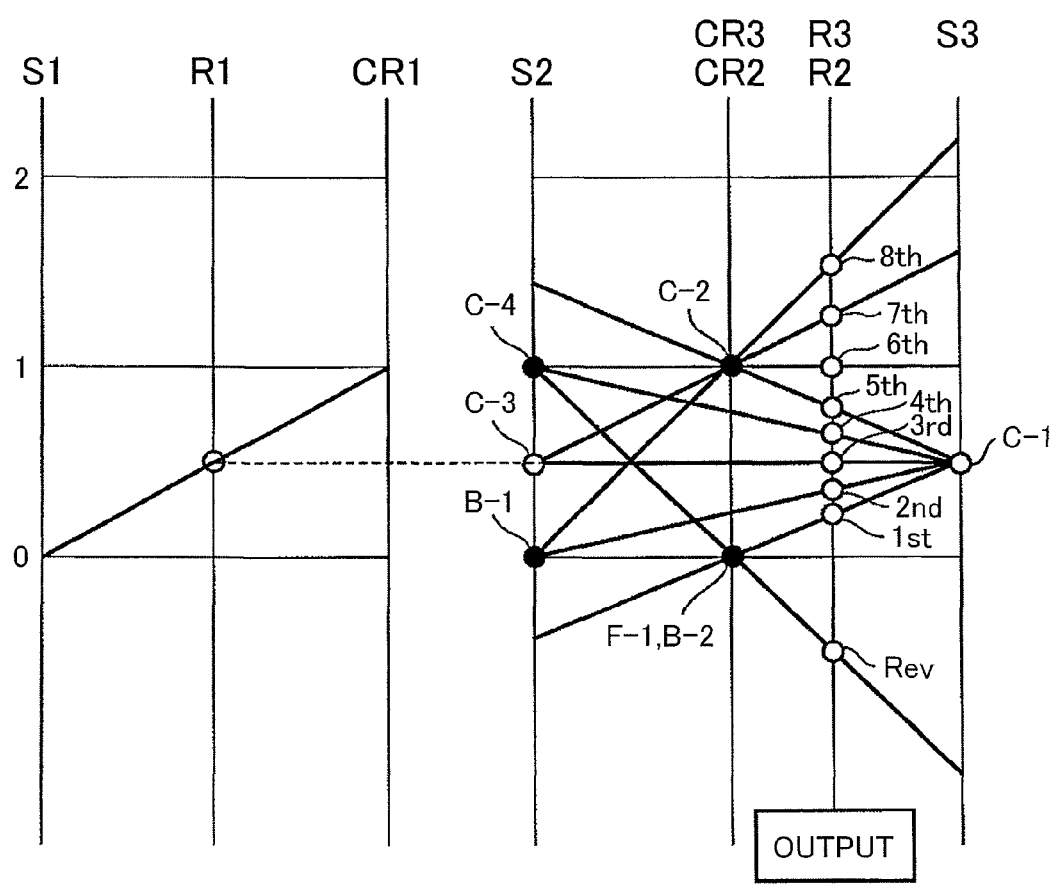
FIG. 3 is a speed line map for the automatic transmission.

Based on the above configuration, the operation of the speed change mechanism 2 will be explained next with reference to FIGS. 1, 2 and 3. Note that FIG. 2 is an engagement chart of the automatic transmission, wherein "O" indicates the element is in use (engaged, locked) and "(O)" indicates the engine brake is in use (locked). In the speed line map shown in FIG. 3, the vertical axis indicates the rotational speeds of the various rotational elements (gears) and the horizontal axis indicates the corresponding gear ratios of the rotational elements. Regarding the planetary gear DP portion of the speed line map, the vertical axis farthest to the side in the horizontal direction (the left side in FIG. 3) corresponds to the sun gear S1, and the vertical axes to the right of this axis correspond to the ring gear R1 and the carrier CR1 in that order. Regarding the planetary gear unit PU portion of the speed line map, the vertical axis farthest to the side in the horizontal direction (the right side in FIG. 3) corresponds to the sun gear S3, and the vertical axes to the left of this axis correspond to the ring gear R3 (R2), the carrier CR2 (CR3), and the sun gear S2 in that order.

For example, in a first forward speed (1st) of the drive (D) range, as shown in FIG. 2, the first clutch C-1 and the one-way clutch F-1 are engaged. In this state, as FIGS. 1 and 3 show, the stationary sun gear S1 and the input rotation of the carrier CR1 cause the rotation of the ring gear R1, which is a deceleration rotation, to be input to the sun gear S3 through the first clutch C-1. The rotation of the carrier CR2 is restricted to the one direction (the forward rotation direction), that is, the carrier CR2 is in a fixed stated in which reverse rotation is prevented. Thus the deceleration rotation that is input to the sun gear S3 is output to the ring gear R3 through the fixed carrier CR2, and the forward rotation is output as the first forward speed from the output shaft 15.

Note that during engine braking (during coasting), the second brake B-2 is engaged and the carrier CR2 is stationary, such that the first forward speed state is maintained in a form that prevents the forward rotation of the second carrier CR2. Moreover, in the first forward speed, the reverse rotation of the carrier CR2 is prevented by the one-way clutch F-1, while the forward rotation is permitted, so the shift into the first forward speed, such as when a shift is made from the non-drive range to the drive range, for example, can be accomplished smoothly by the automatic engagement of the one-way clutch F-1.

In a second forward speed (2nd), the first clutch C-1 is engaged and the first brake B-1 is locked, as shown in FIG. 2. In this state, as FIGS. 1 and 3 show, the stationary first sun gear S1 and the input rotation of the first carrier CR1 cause the rotation of the ring gear R1, which is a deceleration rotation, to be input to the sun gear S3 through the first clutch C-1. The engaging of the first brake B-1 also makes the rotation of the sun gear S2 stationary. The deceleration rotation of the carrier CR2 thus becomes slower than that of the sun gear S3, such that the deceleration rotation that is input to the sun gear S3 is output through the carrier CR2 to the ring gear R3, and the forward rotation is output as the second forward speed from the output shaft 15.

In a third forward speed (3rd), the first clutch C-1 and the third clutch C-3 are engaged, as shown in FIG. 2. In this state, as FIGS. 1 and 3 show, the stationary sun gear S1 and the input rotation of the carrier CR1 cause the rotation of the ring gear R1, which is a deceleration rotation, to be input to the sun gear S3 through the first clutch C-1. The engaging of the third clutch C-3 also causes the deceleration rotation of the ring gear R1 to be input to the sun gear S2. In other words, the deceleration rotation of the ring gear R1 is input to the sun gear S2 and the sun gear S3, so the planetary gear unit PU becomes directly coupled to the deceleration rotation. The decelerated rotation is thus output to the ring gear R3, and the forward rotation is output as the third forward speed from the output shaft 15.

In a fourth forward speed (4th), the first clutch C-1 and the fourth clutch C-4 are engaged, as shown in FIG. 2. In this state, as FIGS. 1 and 3 show, the stationary sun gear S1 and the input rotation of the carrier CR1 cause the rotation of the ring gear R1, which is a deceleration rotation, to be input to the sun gear S3 through the first clutch C-1. The engaging of the fourth clutch C-4 causes the input rotation of the carrier CR1 to be input to the sun gear S2. The deceleration rotation of the carrier CR2 thus becomes faster than that of the sun gear S3, such that the deceleration rotation that is input to the sun gear S3 is output through the carrier CR2 to the ring gear R3, and the forward rotation is output as the fourth forward speed from the output shaft 15.

In a fifth forward speed (5th), the first clutch C-1 and the second clutch C-2 are engaged, as shown in FIG. 2. In this state, as FIGS. 1 and 3 show, the stationary sun gear S1 and the input rotation of the carrier CR1 cause the rotation of the ring gear R1, which is a deceleration rotation, to be input to the sun gear S3 through the first clutch C-1. The engaging of the second clutch C-2 causes the input rotation to be input to the carrier CR2. In this state, the deceleration rotation that is input to the sun gear S3 and the input rotation that is input to the carrier CR2 make the deceleration rotation faster than in the fourth forward speed, such that the deceleration rotation is output to the ring gear R3, and the forward rotation is output as the fifth forward speed from the output shaft 15.

In a sixth forward speed (6th), the second clutch C-2 and the fourth clutch C-4 are engaged, as shown in FIG. 2. In this state, as FIGS. 1 and 3 show, the engaging of the fourth clutch C-4 causes the input rotation of the carrier CR1 to be input to the sun gear S2. The engaging of the second clutch C-2 causes the input rotation to be input to the carrier CR2. In other words, the input rotation is input to the sun gear S2 and the carrier CR2, so the planetary gear unit PU becomes directly coupled to the input rotation. The input rotation is thus output to the ring gear R3, and the forward rotation is output as the sixth forward speed (direct-coupling speed) from the output shaft 15.

In a seventh forward speed (7th), the second clutch C-2 and the third clutch C-3 are engaged, as shown in FIG. 2. In this state, as FIGS. 1 and 3 show, the stationary sun gear S1 and the input rotation of the carrier CR1 cause the rotation of the ring gear R1, which is a deceleration rotation, to be input to the sun gear S2 through the third clutch C-3. The engaging of the second clutch C-2 causes the input rotation to be input to the carrier CR2. In this state, the deceleration rotation that is input to the sun gear S2 and the input rotation that is input to the carrier CR2 make the acceleration rotation slightly faster than the input rotation, such that the acceleration rotation is output to the ring gear R3, and the forward rotation is output as the seventh forward speed (a first overdrive speed that is faster than the direct-coupling speed) from the output shaft 15.

In an eighth forward speed (8th), the second clutch C-2 is engaged and the first brake B-1 is locked, as shown in FIG. 2. In this state, as FIGS. 1 and 3 show, the engaging of the second clutch C-2 causes the input rotation to be input to the carrier CR2. The engaging of the first brake B-1 also makes the rotation of the sun gear S2 stationary. Because the sun gear S2 is stationary, the input rotation of the carrier CR2 becomes faster than in the seventh forward speed and is output to the ring gear R3, such that the forward rotation is output as the eighth forward speed (a second overdrive speed that is faster than the direct-coupling speed) from the output shaft 15.

In a reverse speed (Rev), the fourth clutch C-4 is engaged and the second brake B-2 is locked, as shown in FIG. 2. In this state, as FIGS. 1 and 3 show, the engaging of the fourth clutch C-4 causes the input rotation of the carrier CR1 to be input to the sun gear S2. The engaging of the second brake B-2 also makes the rotation of the carrier CR2 stationary. Thus the input rotation that is input to the sun gear S2 is output to the ring gear R3 through the fixed carrier CR2, and the reverse rotation is output as the reverse speed from the output shaft 15.

Note that in this automatic transmission, the hydraulic control executed by a hydraulic control device 20 (described in detail later) engages the fourth clutch C-4 and the second brake B-2 while in the reverse range to form the reverse speed. Various modifications are acceptable, however, such as forming only a first reverse speed or also forming a second reverse speed by engaging (locking) the second brake B-2 and the third clutch C-3.

In the park (P) range and the neutral (N) range, for example, the first clutch C-1, the second clutch C-2, the third clutch C-3, and the fourth clutch C-4 are released. In these states, the carrier CR1 and the sun gear S2 are not connected, and the ring gear R1, the sun gear S2, and the sun gear S3 are not connected. That is, the planetary gear DP and the planetary gear unit PU are not connected. Furthermore, the input shaft 12 (the intermediate shaft 13) and the carrier CR2 are not connected. This means that the transmission of power between the input shaft 12 and the planetary gear unit PU is cut off. In other words, the transmission of power between the input shaft 12 and the output shaft 15 is cut off.

Overall Configuration of Hydraulic Control Device

The hydraulic control device 20 for the automatic transmission according to the present invention will be described next with reference to FIG. 5. Note that in a first embodiment, there is actually one spool in each valve, but in order to explain a switching position or a control position of the spool position, the state of the right-hand half portion shown in FIG. 5 (and FIGS. 7 and 9 later) is referred to as a "right half position" and the state of the left-hand half portion is referred to as a "left half position".

The hydraulic control device 20 includes a strainer, an oil pump, a primary regulator valve, a secondary regulator valve, a solenoid modulator valve, and a linear solenoid valve SLT (all not shown), which are mainly used to regulate and generate hydraulic pressures as various source pressures. It should be noted that in the present embodiment, the oil pump and the primary regulator valve are shown together as a line pressure source (source pressure source) 5 that generates a line pressure $P_L$ (see FIGS. 5, 7, and 9).

In order to electrically control and supply hydraulic pressure, the hydraulic control device 20 also includes a linear solenoid valve SL1, a linear solenoid valve SL2, a linear solenoid valve SL3, a linear solenoid valve SL4, a linear solenoid valve SL5, a first solenoid valve S1 (a release signal pressure output solenoid valve), a second solenoid valve S2 (a non-release signal pressure output solenoid valve), and a third solenoid valve S3 (a signal pressure output solenoid valve). The hydraulic control device 20 further includes a parking switch valve 32, a parking cylinder 33, a source pressure switch valve 35, and a sorting switch valve 36. Note that in this embodiment, the linear solenoid valves SL1 to SL5 configure solenoid valves for engagement pressure control according to the present invention, as do the linear solenoid valves in second and third embodiments that are described later.

The solenoid valves other than the third solenoid valve S3 in the hydraulic control device 20, namely the linear solenoid valves SL1 to SL5 and the first and second solenoid valves S1 and S2, are a so-called normally-closed (N/C) type of valve whose input port and output port are closed when power is not conducted (referred to as "off" below) and open when power is conducted (referred to as "on" below). Only the third solenoid valve S3 is a normally-open (N/O) type of valve.

The configuration of the hydraulic control device 20 also includes a hydraulic servo 51 that engages and releases the first clutch C-1, a hydraulic servo 52 that engages and releases the second clutch C-2, a hydraulic servo 53 that engages and releases the third clutch C-3, a hydraulic servo 54 that engages and releases the fourth clutch C-4, a hydraulic servo 61 that engages and releases the first brake B-1, and a hydraulic servo 62 that engages and releases the second brake B-2, based on engagement pressures that are respectively regulated and supplied by the linear solenoid valves SL1 to SL5.

Portions in the hydraulic control device 20 that generate various source pressures, that is, a line pressure, a secondary pressure, and a modulator pressure, will be explained next. Note that these portions generating the line pressure, the secondary pressure, and the modulator pressure are similar to hydraulic control devices for a typical automatic transmission and commonly known, and therefore only briefly described here.

The oil pump (not shown) is rotationally and drivingly connected to the pump impeller 7a of the torque converter 7. The oil pump is driven in association with the rotation of the engine and generates a hydraulic pressure by siphoning oil through a strainer (not shown) from an oil pan (not shown). The hydraulic control device 20 includes the linear solenoid valve SLT (not shown), and the linear solenoid valve SLT uses a modulator pressure that is regulated by the solenoid modulator valve (not shown) as a source pressure to regulate and output a signal pressure in accordance with a throttle opening.

The primary regulator valve (not shown) regulates the hydraulic pressure generated by the oil pump to the line pressure $P_L$ in the form of a partial discharge that is based on the signal pressure of the linear solenoid valve SLT, which is input to a spool loaded with the biasing force of a spring. The line pressure $P_L$ is supplied to the various valves mentioned above.

The hydraulic pressure discharged by the primary regulator valve is further regulated to a secondary pressure by the secondary regulator valve (not shown) in the forth of a partial discharge that is based on the signal pressure of the linear solenoid valve SLT, which is input to a spool loaded with the biasing force of a spring. The secondary pressure is supplied to lubrication passages (not shown) and the like, as well as to a lock-up relay valve (not shown), and used as a source pressure for control of the lock-up clutch 10. The solenoid modulator valve (not shown) regulates the line pressure $P_L$ that was regulated by the primary regulator valve to a generally constant modulator pressure when the line pressure $P_L$ reaches a predetermined pressure, based on the biasing force of a spring. The modulator pressure is supplied as a source pressure to the linear solenoid valve SLT (not shown) and the like.

Configuration of Components Associated with All-Solenoids-Off Failure

Components in the hydraulic control device 20 that are associated with an all-solenoids-off failure will be explained with reference to FIG. 5. The hydraulic control device 20 is connected so as to be input with an electrical signal from a control unit 6 based on the driver's operation of a shift lever (or operation of a button, etc.) that is not shown in the figure.

Figure 5:
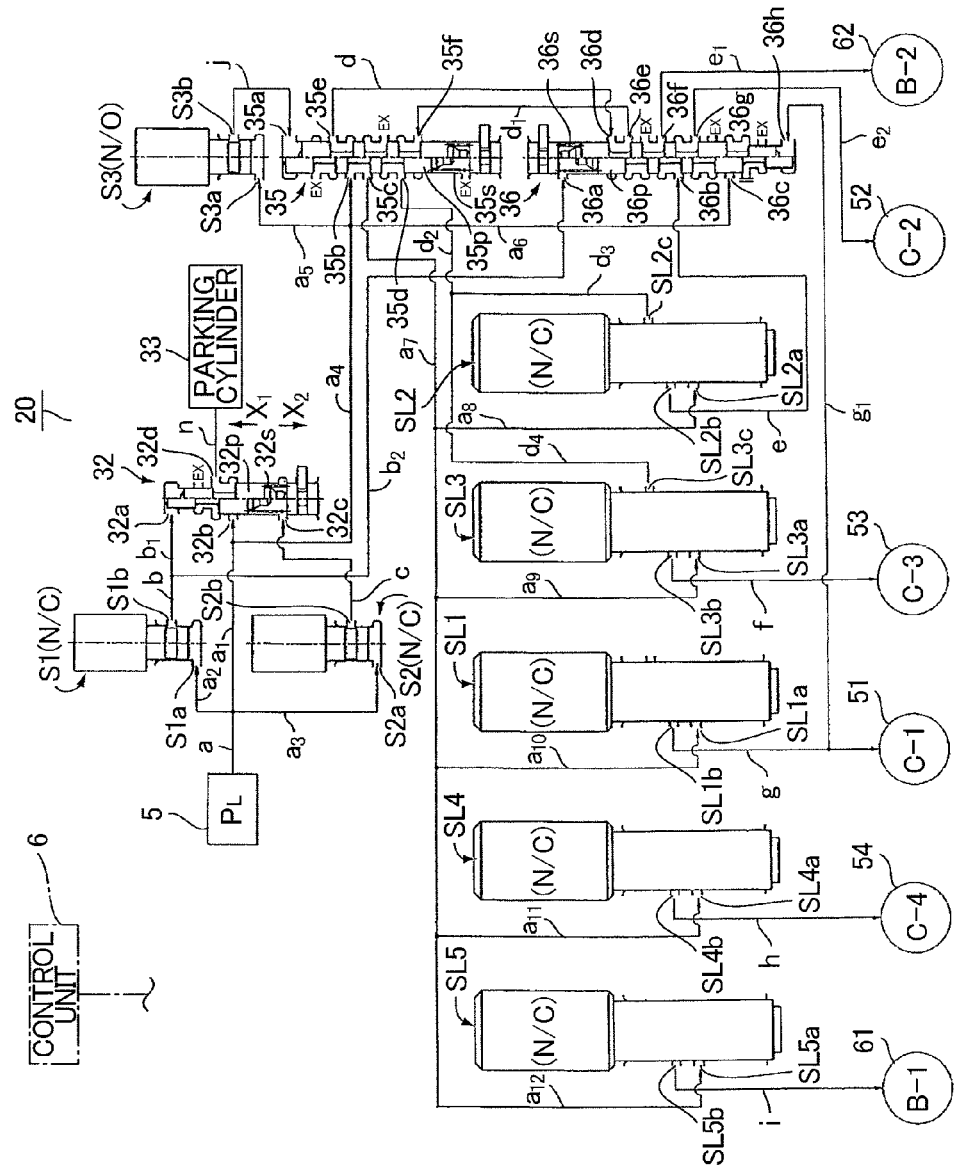
FIG. 5 is a schematic diagram that shows a hydraulic control device for the first embodiment according to the present invention.

As FIG. 5 illustrates, the first and second solenoid valves (on/off solenoids) S1 and S2, which are normally-closed (N/C) types, are configured such that input ports S1a and S2a are respectively input with the line pressure $P_L$ (a source pressure and a lock pressure) through oil passages a, $a_2$, and $a_3$. When power is conducted (when on), signal pressures $P_{S1}$ and $P_{S2}$ are respectively output from output ports S1b and S2b to first and second control oil chambers 32a and 32c of the parking switch valve 32 through oil passages b, $b_1$, and c. The signal pressure $P_{S1}$ (a lock release pressure) from the output port S1b is also input to a first control oil chamber 36a (a lock release pressure input oil chamber) of the sorting switch valve 36 through the oil passages b and $b_2$. Furthermore, the line pressure $P_L$ is input to an input port 32b of the parking switch valve 32 through the oil passages a and $a_1$, and to an input port 35b of the source pressure switch valve 35 through the oil passages a, $a_2$, and $a_4$. Note that the first, second, and third solenoid valves S1, S2, and S3, and their signal pressures will be explained using the same reference signs S1, S2, and S3 as the description above. The linear solenoid valves SL1 to SL5 and their engagement pressures will also be similarly explained using the reference signs SL1 to SL5. This applies to other valves as well.

The parking switch valve 32 has one spool 32p, and a spring 32s that is provided compressed on an end side of the spool 32p and biases the spool 32p in the direction of an arrow $X_1$ (upward in the figure). The parking switch valve 32 further includes a first control oil chamber 32a and a second control oil chamber 32c. The first control oil chamber 32a is disposed on an end (on the arrow $X_1$ side) of the spool 32p and the signal pressure $P_{S1}$ from the output port S1b of the first solenoid valve S1 acts on the first control oil chamber 32a. The second control oil chamber 32c is disposed on another end (on an arrow $X_2$ side) of the spool 32p and the signal pressure $P_{S2}$ from the output port S2b of the second solenoid valve S2 acts on the second control oil chamber 32c.

The parking switch valve 32 additionally includes an exhaust port EX, an input port 32b that is supplied with the line pressure $P_L$, and an output port 32d that is in communication with or cut off from the input port 32b depending on the movement of the spool 32p. The output port 32d is in communication with a parking cylinder 33 of a parking device through an oil passage n. The spool 32p has a large-diameter land portion on a lower side in the figure and a small-diameter land portion on an upper side in the figure. A narrowed portion and an oil chamber are formed between the large-diameter land portion and the small-diameter land portion. When the spool 32p takes the right half position by moving downward against the biasing force of the spring 32s and the line pressure $P_L$ that is input from the input port 32b acts on the narrowed portion, an outer diameter difference between the large-diameter land portion and the small-diameter land portion, that is, a difference in pressure-receiving areas, causes the spool 32p to be biased by a force stronger than the biasing force of the spring 32s in a direction opposite the biasing direction of the spring 32s, namely in the direction of the arrow $X_2$, thus locking the spool 32p.

Here, a parking device 9 that is operated by the parking cylinder 33 will be explained with reference to FIG. 6. The parking device 9 includes the parking cylinder 33, a parking rod 23, a support 16, a parking pole 17, and a parking gear 21, as shown in the figure. The parking cylinder 33 is connected to the valve body 22, and the parking rod 23 is penetratingly disposed on a base end side of the parking cylinder 33 so as to be movable in the axial direction. The parking rod 23 has a wedge 24 with a cone shape that is loosely fitted on a distal end side of the parking rod 23 so as to be movable in the axial direction. A spring 15 is disposed between a flange portion 14 that is fixed to a case (not shown) and the wedge 24. The support 16 is disposed below the distal end side of the parking rod 23, and the wedge 24 is arranged so as to be insertable between the support 16 and the parking pole 17. The parking pole 17 is disposed swingable in the generally vertical direction around a shaft 18 on the base end side of the parking pole 17. A tab portion 19 is provided projecting from an upper side of an intermediate portion of the parking pole 17, and is capable of engaging and releasing the parking gear 21 that is fixed on an output shaft (not shown) of the automatic transmission.

The parking cylinder 33 is configured to achieve a parking release state when the hydraulic pressure from the output port 32d of the parking switch valve 32 acts on the parking cylinder 33, such that the parking rod 23 moves against the biasing force of the spring 15 toward the parking cylinder 33 side, which removes the wedge 24 from between the support 16 and parking pole 17, and thus swings the parking pole 17 downward to release the tab portion 19 from meshing with the parking gear 21. On the other hand, a parking state is achieved when the hydraulic pressure from the parking switch valve 32 is cut off and the hydraulic pressure acting on the parking cylinder 33 is drained, such that the parking rod 23 moves toward the parking pole side 17 due to the biasing force of the spring 15, which inserts the wedge 24 between the support 16 and parking pole 17, and thus swings the parking pole 17 upward to mesh the tab portion 19 with the parking gear 21.

As illustrated in FIG. 5, when the signal pressure $P_{S1}$ from the output port S1b of the first solenoid valve 51 does not act on the first control oil chamber 32a, the spool 32p of the parking switch valve 32 moves upward in the figure to take the left half position due to the biasing force of the spring 32s, and cuts off output from the output port 32d to the parking cylinder 33. However, when the signal pressure $P_{S2}$ from the output port S2b of the second solenoid valve S2 does not act on the second control oil chamber 32c and the signal pressure $P_{S1}$ from the output port SL1b of the first solenoid valve S1 is input to the first control oil chamber 32a, or when the signal pressure $P_{S2}$ does not act on the second control oil chamber 32c and the line pressure $P_L$ continues to act on the input port 32b, the spool 32p of the parking switch valve 32 is moved downward in the figure to the right half position so that the parking cylinder 33 is supplied with the hydraulic pressure from the output port 32d.

The third solenoid valve (on/off solenoid) S3, which is a normally-open type, is configured such that the line pressure $P_L$ acts in a branching form on the input port 32b of the parking switch valve 32 and on an input port S3a through an oil passage $a_5$. In a non-conducting (off) state, the line pressure $P_L$ is output as a signal pressure $P_{S3}$ from an output port S3b to a control oil chamber 35a of the source pressure switch valve 35 through an oil passage j. In a conducting (on) state, the signal pressure $P_{S3}$ is cut off.

The source pressure switch valve 35 includes the control oil chamber 35a, an input port 35b, an output port 35c, an output port 35d, and output port 35e, and input port 35f, an exhaust port EX, a spool 35p, and a spring 35s that biases the spool 35p upward in the figure. The spool 35p moves downward in the figure to take the right half position when the signal pressure $P_{S3}$ is input to the control oil chamber 35a. Otherwise, the spool 35p is moved upward in the figure to the left half position due to the biasing force of the spring 35s.

The sorting switch valve 36 includes: a first control oil chamber 36a that is input with the signal pressure $P_{S1}$ that is output from the output port S1b of the first solenoid valve S1 in a branched form; an input port 36b that is input with an engagement pressure that is output from the output port SL2b of the linear solenoid valve SL2; an input port 36c (a second lock pressure input oil chamber) that is input with the line pressure $P_L$ (the lock pressure) through an oil passage $a_6$; an input port 36d that is input with the hydraulic pressure that is output from the output port 35e of the source pressure switch valve 35 through an oil passage d when an all-solenoids-off failure occurs (when a failure where no power is conducted to any of the solenoid valves occurs); an output port 36e that outputs the hydraulic pressure from the output port 35e, which was input to the input port 36d with a spool 36p in the right half position, to the input port 35f through an oil passage $d_1$; an output port 36f that outputs an engagement pressure $P_{SL2}$ from the linear solenoid valve SL2, which was input to the input port 36b, to the hydraulic servo 62 through an oil passage $e_1$ with the spool 36p in the left half position; an output port 36g that outputs the engagement pressure $P_{SL2}$ to the hydraulic servo 52 through an oil passage $e_2$ with the spool 36p in the right half position; a second control oil chamber 36h (a forward engagement pressure input oil chamber) that is input with an engagement pressure $P_{SL1}$ from the output port SL1b of the linear solenoid valve SL1 through an oil passage $g_1$; the spool 36p; and a spring 36s (a biasing mechanism) that biases the spool 36p downward in the figure.

The spool 36p of the sorting switch valve 36 is moved upward in the figure to the right half position when the engagement pressure $P_{SL1}$ is input from the output port SL1b to the second control oil chamber 36h, without the signal pressure $P_{S1}$ being input from the output port S1b to the first control oil chamber 36a. The sorting switch valve 36 is configured such that the spool 36p has a small-diameter land portion that is formed at the lowest portion of the spool 36p in the figure, and a large-diameter land portion that is formed sandwiching a narrowed portion directly above the small-diameter land portion. The line pressure $P_L$ from the input port 36c can thus be input to an oil chamber provided in a part of the narrowed portion. Accordingly, when the spool 36p of the sorting switch valve 36 moves upward against the biasing force of the spring 36s to take the right half position, the line pressure $P_L$ is input to the oil chamber from the input port 36c. Therefore, based on the difference in the pressure-receiving areas of the large-diameter land portion on the upper side and the small-diameter land portion on the lower side, the spool 36p is biased in a direction opposite the biasing direction of the spring 36s, namely upward in the figure, by a force stronger than the biasing force of the spring 36s and thus locked. If the signal pressure $P_{S1}$ is input from the output port S1b to the first control oil chamber 36a while the spool 36p is locked, the biasing force generated by the signal pressure $P_{S1}$ and the biasing force generated by the spring 36s combine together and overpower the biasing force locking the spool 36p. Consequently, the spool 36p moves downward in the figure to take the left half position.

The linear solenoid valve SL1 includes an input port SL1a that during normal operation is input with the line pressure $P_L$ from the output port 35c of the source pressure switch valve 35 through oil passages $a_7$ and $a_{10}$; an output port SL1b that, when power is conducted, regulates the line pressure $P_L$ and outputs the line pressure $P_L$ as the engagement pressure $P_{SL1}$ to the hydraulic servo 51 through an oil passage g; and an exhaust port (not shown) for mainly draining the engagement pressure $P_{SL1}$ of the hydraulic servo 51.

The linear solenoid valve SL2 includes an input port SL2a that during normal operation is input with the line pressure $P_L$ from the output port 35c of the source pressure switch valve 35 through oil passages $a_7$ and $a_8$; an output port SL2b that, when power is conducted, regulates the line pressure $P_L$ and outputs the line pressure $P_L$ to the input port 36b of the sorting switch valve 36 through an oil passage e; and an exhaust port SL2c that communicates with the output port 35d of the source pressure switch valve 35 through oil passages $d_2$ and $d_3$. During times of normal operation, the exhaust port SL2c drains from the exhaust port EX through the output port 35d. If an all-solenoids-off failure occurs, the exhaust port SL2c reversely inputs a reverse input pressure $P_{35d}$ from the output port 35d through oil passages $d_2$ and $d_3$.

The linear solenoid valve SL3 includes an input port SL3a that during normal operation is input with the line pressure $P_L$ from the output port 35c of the source pressure switch valve 35 through oil passages $a_7$ and $a_9$; an output port SL3b that, when power is conducted, regulates the line pressure $P_L$ and outputs the line pressure $P_L$ as the engagement pressure $P_{SL3}$ to the hydraulic servo 53 through an oil passage f; and an exhaust port SL3b that communicates with the output port 35d of the source pressure switch valve 35. During times of normal operation, the exhaust port SL3c drains from the exhaust port EX through the output port 35d. If an all-solenoids-off failure occurs, the exhaust port SL3c reversely inputs the reverse input pressure $P_{35d}$ from the output port 35d through oil passages $d_2$ and $d_4$.

The linear solenoid valve SL4 includes an input port SL4a that during normal operation is input with the line pressure $P_L$ from the output port 35c of the source pressure switch valve 35 through oil passages $a_7$ and $a_{11}$; an output port SL4b that, when power is conducted, regulates the line pressure $P_L$ and outputs the line pressure $P_L$ as an engagement pressure $P_{SL4}$ to the hydraulic servo 54 through an oil passage h; and an exhaust port (not shown) for mainly draining an engagement pressure $P_{C4}$ of the hydraulic servo 54.

The linear solenoid valve SL5 includes an input port SL5a that during normal operation is input with the line pressure $P_L$ from the output port 35c of the source pressure switch valve 35 through oil passages $a_7$ and $a_{12}$; an output port SL5b that, when power is conducted, regulates the line pressure $P_L$ and outputs the line pressure $P_L$ as an engagement pressure $P_{SL5}$ to the hydraulic servo 61 through an oil passage i; and an exhaust port (not shown) for mainly draining an engagement pressure $P_{B1}$ of the hydraulic servo 61.

In the first embodiment, the paths of the oil passages d, $d_1$, $d_2$, $d_3$, and $d_4$ form a state variable oil passage and a reverse input oil passage.

Operation of Gear Speeds

The operation of the gear speeds according to the hydraulic control device 20 as described will be explained now with reference to FIG. 5 and the operation chart for the automatic transmission in FIG. 4. Note that a shift lever (not shown) that is mounted by the driver seat of an automobile in which the hydraulic control device 20 is installed may be operated in the order of the park (P) range, the reverse (R) range, the neutral (N) range, and the drive (D) range in the movement direction of the shift lever from top to bottom.

Namely, in the P range, the control unit 6 controls the first solenoid valve S1 to off so that the signal pressure $P_{S1}$ is not output from the output port S1b, and the control unit 6 controls the second and third solenoid valves S2 and S3 to on so that the signal pressure $P_{S2}$ is output from the output port S2b.

Because the signal pressure $P_{S1}$ does not act on the first control oil chamber 32a and the signal pressure $P_{S2}$ acts on the second control oil chamber 32c in the parking switch valve 32, the spool 32p moves to the left half position in cooperation with the biasing force of the spring 32s, thus cutting off input of the line pressure $P_L$ to the input port 32b. Therefore, the hydraulic pressure from the parking switch valve 32 to the parking cylinder 33 is cut off, such that the parking rod 23 moves toward the parking pole side 17 due to the biasing force of the spring 15, which inserts the wedge 24 between the support 16 and parking pole 17, and thus meshes the tab portion 19 with the parking gear 21 to achieve the parking state.

In such case, the control unit 6 controls the third solenoid valve S3 to on so that the signal pressure $P_{S3}$ from the output port S3b does not act on the control oil chamber 35a of the source pressure switch valve 35 and the spool 35p moves to take the left half position. Therefore, the line pressure $P_L$ that acts on the input port 35b is output to all the linear solenoid valves SL1 to SL5 from the output port 35c. However, because the linear solenoid valves SL1 to SL5 are all off, the engagement pressures $P_{SL1}$ to $P_{SL5}$ are not output.

When the shift lever is operated to the R range, the control unit 6 controls the first solenoid valve S1 to on so that the signal pressure $P_{S1}$ is output from the output port S1b and acts on the first control oil chamber 32a of the parking switch valve 32. Therefore, the spool 32p moves to the right half position against the biasing force of the spring 32s such that the input of the line pressure $P_L$ to the input port 32b is output from the output 32d. Consequently, the parking rod 23 moves toward the parking cylinder 33 side against the biasing force of the spring 15, which removes the wedge 24 from between the support 16 and parking pole 17, and thus releases the tab portion 19 from meshing with the parking gear 21 to achieve the parking release state. The parking switch valve 32 whose spool 32p is placed in the right half position is locked in the right half position due to the difference in the pressure-receiving areas of the large-diameter land portion and the small-diameter land portion.

In this case, the third solenoid valve S3 is turned on so that the signal pressure $P_{S3}$ from the output port S3b does not act on the control oil chamber 35a of the source pressure switch valve 35 and the spool 35p moves to take the left half position. Therefore, the line pressure $P_L$ that acts on the input port 35b is output to all the linear solenoid valves SL1 to SL5 from the output port 35c. At such time, because the linear solenoid valves SL2 and SL4 are on, the engagement pressure $P_{SL2}$ is output from the output port SL2b to the input port 36b of the sorting switch valve 36. Meanwhile, the first solenoid valve S1 remaining on and the spool 36p placed in the left half position cause the engagement pressure $P_{SL2}$ to be supplied from the input port 36b to the hydraulic servo 62 through the output port 36f, thus engaging the second brake B-2. At the same time, operating the linear solenoid valve SL4 to on causes the line pressure $P_L$ from the output port 35c of the source pressure switch valve 35 to be regulated and output as the engagement pressure $P_{SL4}$ from the output port SL4b to the hydraulic servo 54, thus engaging the fourth clutch C-4. Consequently, the engagement of the fourth clutch C-4 in combination with the engagement of the second brake B-2 achieves a reverse speed.

When the shift lever is operated to the N range, similar to the R range, turning the first solenoid valve S1 on causes the parking switch valve 32 to take the right half position, such that the parking release state is achieved. The energized third solenoid valve S3 causes the source pressure switch valve 35 to take the left half position, and the line pressure $P_L$ that acts on the input port 35*b* is output to all the linear solenoid valves SL1 to SL5. In such case, similar to the P range, because the linear solenoid valves SL1 to SL5 are all off, the engagement pressures $P_{SL1}$ to $P_{SL5}$ are not output, and a neutral state is thus achieved.

In the first forward speed when the shift lever is in a forward range, that is, the D range, the control unit 6 controls the first and second solenoid valves S1 and S2 to off, such that both the signal pressures $P_{S1}$ and $P_{S2}$ are not output from the output ports S1*b* and S2*b*, and the parking switch valve 32 is locked in the right half position to achieve the parking release state.

In this case, the third solenoid valve S3 is controlled by the control unit 6 to off so that the spool 35*p* of the source pressure switch valve 35 is placed in the left half position. Therefore, the line pressure $P_L$ that acts on the input port 35*b* is output to all the linear solenoid valves SL1 to SL5 from the output port 35*c*. Because the linear solenoid valve SL1 is on here, the engagement pressure $P_{SL1}$ is supplied from the output port SL1*b* to the first clutch C-1 to engage the clutch C-1. The engagement of the first clutch C-1 in combination with the engagement of the one-way clutch F-1 achieves the first forward speed.

During engine braking in the first forward speed while the shift lever is in the D range, similar to the R and N ranges, turning the first solenoid valve S1 on causes the parking switch valve 32 to take the right half position, such that the parking release state is achieved. The energized third solenoid valve S3 causes the source pressure switch valve 35 to take the left half position, and the line pressure $P_L$ that acts on the input port 35*b* is output to all the linear solenoid valves SL1 to SL5.

In such case, similar to the first forward speed when in the forward range, turning the third solenoid valve on causes the source pressure switch valve 35 to take the left half position, such that the line pressure $P_L$ is output to all the linear solenoid valves SL1 to SL5. In this state, both the linear solenoid valves SL1 and SL2 are turned on. Therefore, the engagement pressure $P_{SL1}$ is supplied from the output port SL1*b* of the linear solenoid valve SL1 to the hydraulic servo 51, thus engaging the first clutch C-1. Furthermore, the engagement pressure $P_{SL2}$ is output from the output port SL2*b* of the linear solenoid valve SL2 to the input port 36*b* of the sorting switch valve 36. At such time, the engagement pressure $P_{SL1}$ is input to the second control oil chamber 36*h* and the signal pressure $P_{S1}$ is input to the first control oil chamber 36*a*, such that the sorting switch valve 36 takes the left half position in cooperation with the biasing force of the spring 36*s*. Therefore, the engagement pressure $P_{SL2}$ is supplied from the input port 36*b* to the hydraulic servo 62 through the output port 36*f*, thus engaging the second brake B-2. Consequently, the engagement of the second brake B-2 in combination with the engagement of the first clutch C-1 achieves engine braking in the first forward speed.

In the second forward speed when the shift lever is in the D range, the control unit 6 controls the first and second solenoid valves S1 and S2 to off, such that both the signal pressures $P_{S1}$ and $P_{S2}$ are not output from the output ports S1*b* and S2*b*, and the parking switch valve 32 is locked in the right half position to achieve the parking release state.

In this case, the control unit 6 controls the third solenoid valve S3 to on so that the signal pressure $P_{S3}$ from the output port S3*b* does not act on the control oil chamber 35*a* of the source pressure switch valve 35 and the spool 35*p* takes the left half position. Therefore, the line pressure $P_L$ that acts on the input port 35*b* is output to all the linear solenoid valves SL1 to SL5 from the output port 35*c*. Because the linear solenoid valves SL1 and SL5 are turned on here, the engagement pressure $P_{SL1}$ is supplied from the output port SL1*b* of the linear solenoid valve SL1 to the hydraulic servo 51 to engage the first clutch C-1, and the engagement pressure $P_{SL5}$ is supplied from the output port SL5*b* of the linear solenoid valve SL5 to the hydraulic servo 61 to engage the first brake B-1, thus achieving the second forward speed.

In the third forward speed when the shift lever is in the D range, similar to the above, the first and second solenoid valves S1 and S2 are turned off, such that the parking switch valve 32 is locked in the right half position to achieve the parking release state.

In such case, similar to the above, turning the third solenoid S3 on causes the line pressure $P_L$ to be output to all the linear solenoid valves SL1 to SL5. Because the linear solenoid valves SL1 and SL3 are turned on here, the engagement pressure $P_{SL1}$ is supplied from the output port SL1*b* of the linear solenoid valve SL1 to the hydraulic servo 51 to engage the first clutch C-1, and the engagement pressure $P_{SL1}$ is supplied from the output port SL3*b* of the linear solenoid valve SL3 to the hydraulic servo 53 to engage the third clutch C-3, thus achieving the third forward speed.

In the fourth forward speed when the shift lever is in the D range, similar to the above, the first and second solenoid valves S1 and S2 are turned off, such that the parking switch valve 32 is locked in the right half position to achieve the parking release state.

In such case, turning the third solenoid S3 on causes the line pressure $P_L$ to be output to all the linear solenoid valves SL1 to SL5. Because the linear solenoid valves SL1 and SL4 are turned on here, the engagement pressure $P_{SL1}$ is supplied from the output port SL1*b* of the linear solenoid valve SL1 to the hydraulic servo 51 to engage the first clutch C-1, and the engagement pressure $P_{SL4}$ is supplied from the output port SL4*b* of the linear solenoid valve SL4 to the hydraulic servo 54 to engage the fourth clutch C-4, thus achieving the fourth forward speed.

In the fifth forward speed when the shift lever is in the D range, similar to the above, the first and second solenoid valves S1 and S2 are turned off, such that the parking switch valve 32 is locked in the right half position to achieve the parking release state.

In such case, turning the third solenoid S3 on causes the line pressure $P_L$ to be output to all the linear solenoid valves SL1 to SL5. Because the linear solenoid valves SL1 and SL2 are turned on here, the engagement pressure $P_{SL1}$ is supplied from the output port SL1*b* of the linear solenoid valve SL1 to the hydraulic servo 51 to engage the first clutch C-1. Furthermore, the engagement pressure $P_{SL2}$ is output from the output port SL2*b* of the linear solenoid valve SL2 to the input port 36*b* of the sorting switch valve 36. At such time, the engagement pressure $P_{SL1}$ is input to the second control oil chamber 36*h*, such that the sorting switch valve 36 takes the right half position. Therefore, the engagement pressure $P_{SL2}$ is supplied from the input port 36*b* to the hydraulic servo 52 through the output port 36*g*, thus engaging the second clutch C-2. Consequently, the engagement of the second clutch C-2 in combination with the engagement of the first clutch C-1 achieves the fifth forward speed.

In the sixth forward speed when the shift lever is in the D range, similar to the above, the first and second solenoid valves S1 and S2 are turned off, such that the parking switch valve 32 is locked in the right half position to achieve the parking release state.

In such case, similar to the above, turning the third solenoid S3 on causes the line pressure $P_L$ to be output to all the linear solenoid valves SL1 to SL5. Because the linear solenoid valves SL2 and SL4 are turned on here, the engagement pressure $P_{SL4}$ is supplied from the output port SL4b of the linear solenoid valve SL4 to the hydraulic servo 54, thus engaging the fourth clutch C-4. Furthermore, the engagement pressure $P_{SL2}$ is output from the output port SL2b of the linear solenoid valve SL2 to the input port 36b of the sorting switch valve 36. At such time, once the engagement pressure $P_{SL1}$ from the linear solenoid valve SL1 is input to the second control oil chamber 36h in any of the first to fifth forward speeds, the sorting switch valve 36 takes the right half position. Therefore, the engagement pressure $P_{SL2}$ is supplied from the input port 36b to the hydraulic servo 52 through the output port 36g, thus engaging the second clutch C-2. Consequently, the engagement of the second clutch C-2 in combination with the engagement of the fourth clutch C-4 achieves the sixth forward speed.

In the seventh forward speed when the shift lever is in the D range, similar to the above, the first and second solenoid valves S1 and S2 are turned off, such that the parking switch valve 32 is locked in the right half position to achieve the parking release state.

In such case, similar to the above, turning the third solenoid S3 on causes the line pressure $P_L$ to be output to all the linear solenoid valves SL1 to SL5. Because the linear solenoid valves SL2 and SL3 are turned on here, the engagement pressure $P_{SL3}$ is supplied from the output port SL3b of the linear solenoid valve SL3 to the hydraulic servo 53, thus engaging the third clutch C-3. Furthermore, the engagement pressure $P_{SL2}$ is output from the output port SL2b of the linear solenoid valve SL2 to the input port 36b of the sorting switch valve 36, and similar to the case of the sixth forward speed, the engagement pressure $P_{SL2}$ is supplied from the input port 36b to the hydraulic servo 52 through the output port 36g, thus engaging the second clutch C-2. Consequently, the engagement of the second clutch C-2 in combination with the engagement of the third clutch C-3 achieves the seventh forward speed.

In the eighth forward speed when the shift lever is in the D range, similar to the above, the first and second solenoid valves S1 and S2 are turned off, such that the parking switch valve 32 is locked in the right half position to achieve the parking release state.

In such case, similar to the above, turning the third solenoid S3 on causes the line pressure $P_L$ to be output to all the linear solenoid valves SL1 to SL5. Because the linear solenoid valves SL2 and SL5 are turned on here, the engagement pressure $P_{SL5}$ is supplied from the output port SL5b of the linear solenoid valve SL5 to the hydraulic servo 61, thus engaging the first brake B-1. Furthermore, the engagement pressure $P_{SL2}$ is output from the output port SL2b of the linear solenoid valve SL2 to the input port 36b of the sorting switch valve 36, and similar to the case of the sixth forward speed, the engagement pressure $P_{SL2}$ is supplied from the input port 36b to the hydraulic servo 52 through the output port 36g, thus engaging the second clutch C-2. Consequently, the engagement of the second clutch C-2 in combination with the engagement of the first brake B-1 achieves the eighth forward speed.

The hydraulic control device 20 for a multi-speed automatic transmission includes: the first to fourth clutches C-1 to C-4, as well as the first and second brakes B-1 and B-2; the plurality of hydraulic servos 51 to 54, 61, and 62 that engage and release the first to fourth clutches C-1 to C-4, as well as the first and second brakes B-1 and B-2; the linear solenoid valves SL1 to SL5 that number one less than the hydraulic servos 51 to 54, 61, and 62; and the sorting switch valve 36 (indicated with the reference symbol 38 in FIG. 7 and the reference symbol 40 in FIG. 9) that sorts the engagement pressure $P_{SL2}$ from at least one (SL2) of the linear solenoid valves SL1 to SL5 into two of the hydraulic servos (52 and 62). The hydraulic control device 20 is configured such that the sorting switch valve 36 takes the left half position (a first position) that supplies the engagement pressure $P_{SL2}$ to the hydraulic servo 62 at least while in the reverse (R) range, a non-drive (P or N range), and a specific gear speed (engine braking in the first forward speed) of the forward range, and the sorting switch valve 36 takes the right half position (a second position) that supplies the engagement pressure $P_{SL2}$ to the hydraulic servo 52 while in any other forward range (the first to eighth forward speeds).

Operation for All-Solenoid-Valves-Off Failure

The operation when an all-solenoids-off failure occurs will be explained with reference to FIGS. 4 and 5. If a failure is detected in any of the solenoid valves or various types of switch valves and control valves in the hydraulic control device 20 of the automatic transmission, the control unit 6 executes a control to shift to an all-solenoids-off failure mode that turns all the solenoid valves off. Note that all solenoids are similarly off in the event of a disconnection, short-circuit or the like as well, and the all-solenoids-off failure mode in this specification also includes such states.

If the all-solenoids-off failure mode is activated for any reason while the vehicle is traveling in the forward range, all of the solenoid valves are turned off (a failure occurs). In such case, turning all the solenoid valves off causes only the normally-open third solenoid valve S3 to output the signal pressure $P_{S3}$, while the other solenoid valves stop their output of signal pressures and engagement pressures. Consequently, regarding the linear solenoid valves SL2 and SL3 in particular, the output ports SL2b and SL3b and the exhaust ports SL2c and SL3c are placed in communication.

The control oil chamber 35a of the source pressure switch valve 35 is input with the signal pressure $P_{S3}$ of the energized third solenoid valve S3, such that the spool 35p overcomes the biasing force of the spring 35s and switches to the right half position (a reverse-input-pressure output position). Therefore, the line pressure $P_L$ that is input to the input port 35b is output from the output port 35e, and then input to the input port 36d of the sorting switch valve 36. At such time, the sorting switch valve 36 is locked in the right half position based on the difference in the pressure-receiving areas of the large-diameter land portion and the small-diameter land portion as described above. Therefore, the line pressure $P_L$ that was input to the input port 36d is further input to the reverse input port 35f of the source pressure switch valve 35 from the output port 36e, and then respectively input as the reverse input pressure $P_{35d}$ to the exhaust ports SL2c and SL3c of the linear solenoid valves SL2 and SL3 through the output port 35d.

The linear solenoid valve SL2 that was input with the reverse input pressure $P_{35d}$ from the exhaust port SL2c subsequently outputs the reverse input pressure $P_{35d}$ as the engagement pressure $P_{SL2}$ from the output port SL2b. The linear solenoid valve SL2 supplies the engagement pressure $P_{SL2}$ to the hydraulic servo 52 from the input port 36b of the sorting switch valve 36 through the output port 36g, thus engaging the second clutch C-2. At the same time, the linear solenoid valve SL3 that was input with the reverse input pressure $P_{35d}$ from the exhaust port SL3c supplies the engagement pressure $P_{SL3}$ to the hydraulic servo 53 from the exhaust port SL3b, thus engaging the third clutch C-3. Consequently, the engagement of the third clutch C-3 in combination with the engagement of the second clutch C-2 achieves the seventh forward speed.

As explained above, the second clutch C-2 and the third clutch C-3 engage to form the seventh forward speed when the all-solenoids-off failure mode occurs while the vehicle travels in the forward range.

However, the all-solenoids-off failure mode may be activated during travel that uses engine braking in the first forward speed. In such case, the first solenoid valve S1 being energized before the all-solenoids-off failure caused the signal pressure $S_1$ to be input to the first control oil chamber 36a of the sorting switch valve 36, such that the spool 36p is already placed in the left half position before the failure occurs. Therefore, even if the line pressure $P_L$ (a failure hydraulic pressure) from the output port 35e acts on the input port 36d because the third solenoid valve S3 is off during the all-solenoids-off failure, the line pressure $P_L$ is blocked and not reversely input to the linear solenoid valves SL2 and SL3, thus achieving the N range.

Meanwhile, if the all-solenoids-off failure mode is activated while the vehicle is in the P range, for example, all the solenoid valves are turned off so that only the normally-open third solenoid valve S3 outputs the signal pressure $P_{S3}$. Consequently, the line pressure $P_L$ acts on the input port 36d of the sorting switch valve 36 through the input port 35b and the output port 35e of the source pressure switch valve 35. However, in the P range at such time, the linear solenoid valve SL1 is already off before the all-solenoids-off failure occurs and the engagement pressure $P_{SL1}$ from the output port S1b does not act on the second control oil chamber 36h, such that the spool 36p is placed in the left half position. Therefore, the line pressure $P_L$ that acts on the input port 36d is blocked and does not act on the input port 35f of the source pressure switch valve 35. Consequently, the reverse input pressure $P_{35d}$ is not input to the exhaust ports SL2c and SL3c of the linear solenoid valves SL2 and SL3. Furthermore, the parking switch valve 32 is already placed in the left half position such that the line pressure $P_L$ to the parking cylinder 33 is blocked before the all-solenoids-off failure occurs. Therefore, the parking state is maintained.

Thus, when the vehicle experiences the all-solenoids-off failure mode in the P range, none of the first to fourth clutches C-1 to C-4 nor the first and second brakes B-1 and B2 is engaged. Therefore, the P range is maintained.

If the all-solenoids-off failure mode is activated while the vehicle is in the R range, all the solenoid valves are similarly turned off so that only the third solenoid valve S3 outputs the signal pressure $P_{S3}$. Consequently, the line pressure $P_L$ acts on the input port 36d of the sorting switch valve 36. However, in the R range as well at such time, the linear solenoid valve SL1 is already off before the all-solenoids-off failure occurs and the spool 36p placed in the left half position. Therefore, the line pressure $P_L$ that acts on the input port 36d is blocked. Consequently, the reverse input pressure $P_{35d}$ is not input to the exhaust ports SL2c and SL3c of the linear solenoid valves SL2 and SL3. In addition, because the line pressure $P_L$ continues acting on the input port 32b, the spool 32p that was locked in the right half position before the all-solenoids-off failure occurred remains in the right half position. Therefore, the parking release state is maintained.

Thus, when the vehicle experiences the all-solenoids-off failure mode in the R range, none of the first to fourth clutches C-1 to C-4 nor the first and second brakes B-1 and B2 is engaged. Therefore, the automatic transmission shifts to the N range.

Likewise, if the all-solenoids-off failure mode is activated while the vehicle is in the N range, only the third solenoid valve S3 outputs the signal pressure $P_{S3}$. Consequently, the line pressure $P_L$ acts on the input port 36d of the sorting switch valve 36. However, in the N range as well at such time, the linear solenoid valve SL1 is already off before the all-solenoids-off failure occurs and the spool 36p placed in the left half position. Therefore, the line pressure $P_L$ that acts on the input port 36d is blocked. Consequently, the reverse input pressure $P_{35d}$ is not input to the exhaust ports SL2c and SL3c of the linear solenoid valves SL2 and SL3. In addition, because the line pressure $P_L$ continues acting on the input port 32b, the spool 32p that was locked in the right half position before the all-solenoids-off failure occurred remains in the right half position. Therefore, the parking release state is maintained.

Thus, when the vehicle experiences the all-solenoids-off failure mode in the N range, none of the first to fourth clutches C-1 to C-4 nor the first and second brakes B-1 and B2 is engaged. Therefore, the N range is maintained.

As described above, according to the present embodiment, in any of the first to eighth forward speeds and excluding engine braking in the first forward speed, the seventh forward speed (a predetermined forward gear speed) is formed if the all-solenoids-off failure mode occurs to ensure the vehicle's travel. If the all-solenoids-off failure mode occurs when the vehicle is in the P range, R range, or N range, or when using the engine brake in the first forward speed, the P range is maintained if in the P range; the N range is switched to if in the R range; the N range is maintained if in the N range; and the N range is switched to if engine braking in the first forward speed. Thus, the running safety of the vehicle is secured. When the engine is stopped, all supply of the line pressure $P_L$, i.e., the source pressure, is also stopped. Therefore, even if the sorting switch valve 36 is locked in the right half position during engine driving, the spool 36p returns to the left half position. Consequently, the reverse input pressure $P_{35d}$ is not output when re-starting the engine in the P range or N range, and the parking state or the neutral state is achieved without forming the seventh forward speed.

Second Embodiment

Figure 7:
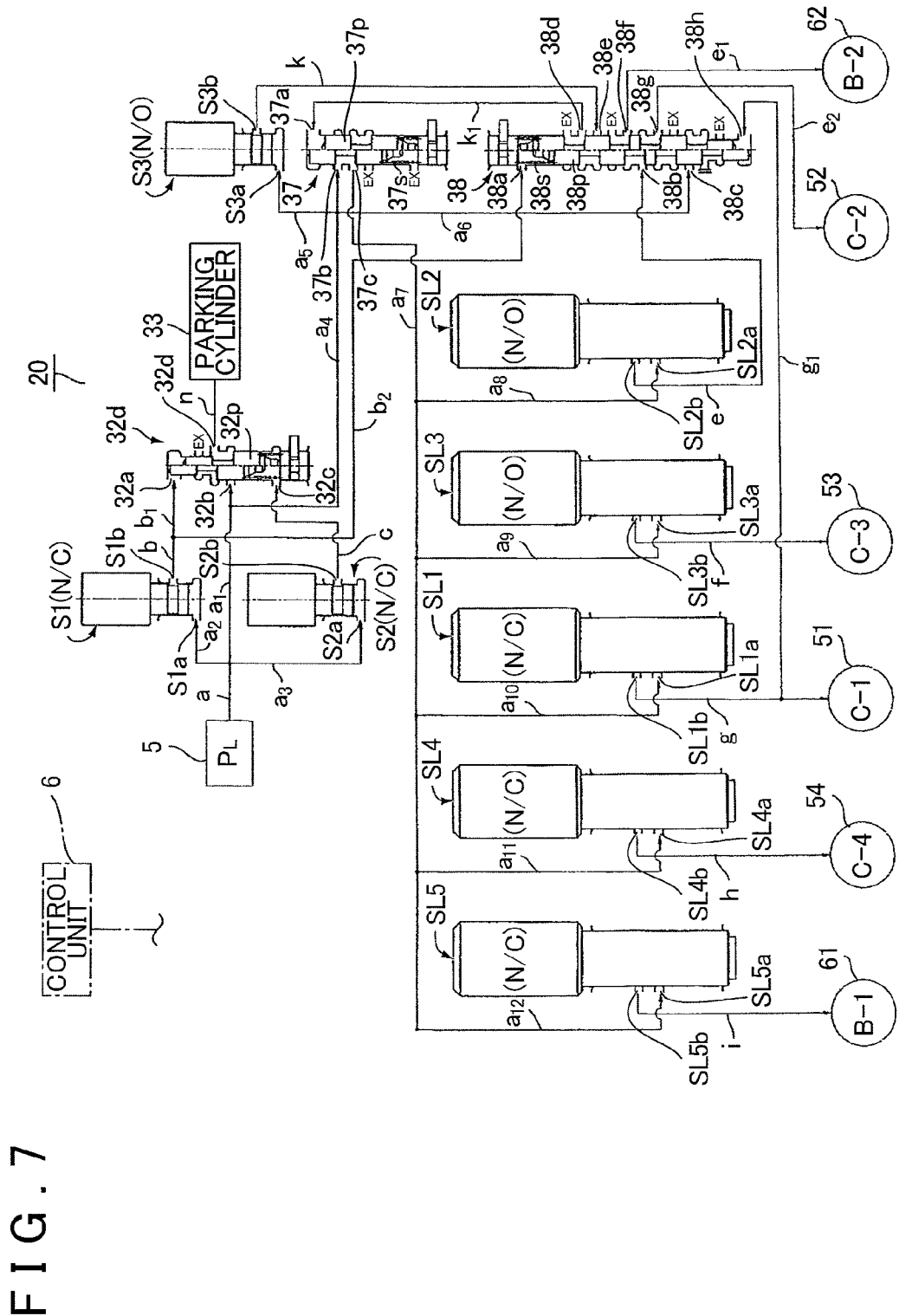
FIG. 7 is a schematic diagram that shows a hydraulic control device for a second embodiment according to the present invention.

A second embodiment that partially modifies the first embodiment described above will be explained now with reference to FIG. 7. In the second embodiment, a source pressure switch valve 37 and a sorting switch valve 38 shown in FIG. 7 are used in place of the source pressure switch valve 35 and the sorting switch valve 36, and the linear solenoid valves SL2 and SL3 are normally-open types. Note that the second embodiment differs from the previous first embodiment only in terms of the above valve configuration, and other portions are generally identical. Therefore, main portions will be indicated with the same reference symbols and not explained here.

The source pressure switch valve 37 in the second embodiment includes a control oil chamber 37a; an input port 37b that is input with the line pressure $P_L$; an output port 37c; an exhaust port EX; a spool 37p; and a spring 37s that biases the spool 37p upward in the figure. The spool 37p moves downward in the figure to take the right half position when a signal pressure $P_{38}$ is input to the control oil chamber 37a from the sorting switch valve 38. Otherwise, the spool 37p is moved upward in the figure to take the left half position due to the biasing force of the spring 37s.

The sorting switch valve 38 includes: a first control oil chamber 38a (a lock release pressure input oil chamber) that is input with the signal pressure $P_{S1}$ (the lock release pressure) that is output from the output port S1b of the first solenoid valve S1 (a release signal pressure output solenoid valve) in a branched form; an input port 38b that is input with the engagement pressure $P_{SL2}$ that is output from the output port SL2b of the linear solenoid valve SL2; an input port 38c (a second lock pressure input oil chamber) that is input with the line pressure $P_L$ (the lock pressure); an input port 38e that is input with the signal pressure $P_{S3}$ that is output from the output port S3b of the third solenoid valve S3 when an all-solenoids-off failure occurs (when a failure where no power is conducted to any of the solenoid valves occurs); an output port 36d that outputs the signal pressure $P_{S3}$, which was input to the input port 36e with a spool 38p in the left half position, to the control oil chamber 37a through an oil passage $k_1$; an output port 38f that outputs the engagement pressure $P_{SL2}$ from the linear solenoid valve SL2, which was input to the input port 38b, to the hydraulic servo 62 with the spool 38p in the left half position; an output port 38g that outputs the engagement pressure $P_{SL2}$ to the hydraulic servo 62 with the spool 38p in the right half position; a second control oil chamber 38h (a forward engagement pressure input oil chamber) that is input with the engagement pressure $P_{SL1}$ from the output port SL1b of the linear solenoid valve SL1; the spool 38p; and a spring 38s (a biasing mechanism) that biases the spool 38p downward in the figure.

The spool 38p of the sorting switch valve 38 is moved upward in the figure to the right half position when the engagement pressure $P_{SL1}$ is input from the output port SL1b to the second control oil chamber 38h, without the signal pressure $P_{S1}$ being input from the output port S1b to the first control oil chamber 38a. The sorting switch valve 38 has the same configuration as the sorting switch valve 36 described above. Accordingly, when the spool 38p of the sorting switch valve 38 moves upward against the biasing force of the spring 38s to take the right half position, the line pressure $P_L$ is input to the oil chamber from the input port 38c. Therefore, based on the difference in the pressure-receiving areas of the large-diameter land portion on the upper side and the small-diameter land portion on the lower side, the spool 38p is biased in a direction opposite the biasing direction of the spring 38s, namely upward in the figure, by a force stronger than the biasing force of the spring 38s and thus locked. Furthermore, when the signal pressure $P_{S1}$ is input from the output port S1b to the first control oil chamber 38a in this locked state, the spool 38p moves downward in the figure to take the left half position.

The spool 38p of the sorting switch valve 38 takes the right half position when the engagement pressure $P_{SL1}$ is input from the output port SL1b to the second control oil chamber 38h, without the signal pressure $P_{S1}$ being input from the output port S1b to the first control oil chamber 38a. The spool 38p takes the left half position when the signal pressure $P_{S1}$ is input to the first control oil chamber 38a, without the engagement pressure $P_{SL1}$ being input to the second control oil chamber 38h.

In the second embodiment, the paths of the oil passages k and $k_1$ form a state variable oil passage and a signal pressure oil passage.

Operation of Gear Speeds

The operation of the gear speeds according to the hydraulic control device 20 of the second embodiment will be explained now with reference to FIG. 7 and the operation chart for the automatic transmission in FIG. 8.

With respect to the P range, the parking state is achieved through an operation identical to that for the P range in the first embodiment. The control unit 6 controls the third solenoid valve S3 to on, such that the signal pressure $P_{S3}$ is not output from the output port S3b and the signal pressure $P_{S1}$ is not input to the first control oil chamber 38a of the sorting switch valve 38 so that the spool 38p takes the left half position. However, this has no effect because the signal pressure $P_{S3}$ is not output to the input port 38e. The signal pressure $P_{S3}$ from the output port 38d not acting on the control oil chamber 37a causes the source pressure switch valve 37 to take the left half position, such that the line pressure $P_L$ is output from the output port 37c to all the linear solenoid valves SL1 to SL5. In such case, the linear solenoid valves SL2 and SL3 are on and the linear solenoid valves SL1, SL4, and SL5 are off. Consequently, none of the engagement pressures $P_{SL1}$ to $P_{SL5}$ are output, thus achieving the P range.

When the shift lever is operated to the R range, the control unit 6 controls the first solenoid valve S1 to on so that the signal pressure $P_{S1}$ is output from the output port S1b and acts on the first control oil chamber 32a of the parking switch valve 32. Therefore, the spool 32p takes the right half position so that the line pressure $P_L$ input to the input port 32b is output from the output port 32d to the parking cylinder 33. Consequently, similar to the R range in the first embodiment, the parking release state is achieved and the spool 32p is locked in the right half position.

Because the third solenoid valve S3 is on at such time, the signal pressure $P_{S3}$ does not act on the input port 38e of the sorting switch valve 38. Consequently, the signal pressure $P_{S3}$ does not act on the control oil chamber 37a and the source pressure switch valve 37 assumes the left half position. Therefore, the line pressure $P_L$ that acts on the input port 37b of the source pressure switch valve 37 is output to all the linear solenoid valves SL1 to SL5 from the output port 37c. At such time, because the linear solenoid valves SL3 and SL4 are turned on and the linear solenoid valves SL1, SL2, and SL5 are turned off, the engagement pressure $P_{SL4}$ is supplied from the output port SL4b of the linear solenoid valve SL4 to the hydraulic servo 54, thus engaging the fourth clutch C-4. In addition, the adjusted engagement pressure $P_{SL2}$ is output from the output port SL2b of the linear solenoid valve SL2 and input to the input port 38b of the sorting switch valve 38. At such time, the energized first solenoid valve S1 and the input of the signal pressure $P_{S1}$ to the first control oil chamber 38a causes the sorting switch valve 38 to take the left half position. Therefore, the engagement pressure $P_{SL2}$ that was input to the input port 38b is output to the hydraulic servo 62 from the output port 38f, thus engaging the second brake B-2. Consequently, the engagement of the second brake B-2 in combination with the engagement of the fourth clutch C-4 achieves the reverse speed.

When the shift lever is operated to the N range, similar to the R range, turning the first solenoid valve S1 on causes the parking switch valve 32 to take the right half position, such that the parking release state is achieved and the spool 32p is locked in the right half position.

Because the third solenoid valve S3 is on at such time, the signal pressure $P_{S3}$ does not act on the input port 38e of the sorting switch valve 38. Consequently, the source pressure switch valve 37 assumes the left half position as described above. Therefore, the line pressure $P_L$ is output to all the linear solenoid valves SL1 to SL5 from the output port 37c of the source pressure switch valve 37. At such time, because the linear solenoid valves SL2 and SL3 are turned on and the linear solenoid valves SL1, SL4, and SL5 are turned off, none of the engagement pressures $P_{SL1}$ to $P_{SL5}$ are output, thus achieving the neutral state.

In the first forward speed when in the forward range, the control unit 6 controls the first and second solenoid valves S1 and S2 to off, such that both the signal pressures $P_{S1}$ and $P_{S2}$ are not output from the output ports S1b and S2b, and the parking switch valve 32 is locked in the right half position to achieve the parking release state.

Because the third solenoid valve S3 is on at such time, the signal pressure $P_{S3}$ does not act on the input port 38e of the sorting switch valve 38. Consequently, the source pressure switch valve 37 assumes the left half position. Therefore, the line pressure $P_L$ is output to all the linear solenoid valves SL1 to SL5 from the output port 37c of the source pressure switch valve 37. At such time, because the linear solenoid valves SL1, SL2, and SL3 are turned on and the linear solenoid valves SL4 and SL5 are turned off, the engagement pressure $P_{SL1}$ is supplied from the output port SL1b of the linear solenoid valve SL1 to the hydraulic servo 51, thus engaging the first clutch C-1. Consequently, the first forward speed is achieved.

During engine braking in the first forward speed, similar to the R and N ranges, turning the first solenoid valve S1 on causes the parking switch valve 32 to take the right half position, such that the parking release state is achieved. The energized third solenoid valve S3 causes the line pressure $P_L$ that acts on the input port 37b to be output to all the linear solenoid valves SL1 to SL5 from the output port 37c.

In such case, because the linear solenoid valves SL1 and SL3 are turned on and the linear solenoid valves SL2, SL4, and SL5 are turned off, the engagement pressure $P_{SL1}$ is supplied from the output port SL1b to the hydraulic servo 51, thus engaging the first clutch C-1. In addition, the de-energized linear solenoid valve SL2 causes the adjusted engagement pressure $P_{SL2}$ to be output from the output port SL2b to the input port 38b of the sorting switch valve 38. At such time, the energized first solenoid valve S1 and the input of the signal pressure $P_{S1}$ to the first control oil chamber 38a of the sorting switch valve 38 causes the spool 38p to take the left half position. Therefore, the engagement pressure $P_{SL2}$ that was input to the input port 38b is supplied to the hydraulic servo 62 from the output port 38f, thus engaging the second brake B-2. Consequently, the engagement of the second brake B-2 in combination with the engagement of the one-way clutch F-1 and the first clutch C-1 achieves engine braking in the first forward speed.

In the second forward speed, the first and second solenoid valves S1 and S2 are turned off, such that both the signal pressures $P_{S1}$ and $P_{S2}$ are not output from the output ports S1b and S2b, and the parking switch valve 32 is locked in the right half position to maintain the parking release state as described above.

Because the third solenoid valve S3 is on at such time, the signal pressure $P_{S3}$ does not act on the input port 38e of the sorting switch valve 38. Consequently, the source pressure switch valve 37 assumes the left half position, and the line pressure $P_L$ is output to all the linear solenoid valves SL1 to SL5 from the output port 37c. In such case, because the linear solenoid valves SL1, SL2, SL3, and SL5 are turned on and the linear solenoid valve SL4 is turned off, the engagement pressure $P_{SL1}$ is supplied from the output port SL1b to the hydraulic servo 51 to engage the first clutch C-1, and the engagement pressure $P_{SL5}$ is supplied from the output port SL5b to the hydraulic servo 61 to engage the first brake B-1. Consequently, the second forward speed is achieved.

In the third forward speed, similar to the above, the first and second solenoid valves S1 and S2 are turned off, such that both the signal pressures $P_{S1}$ and $P_{S2}$ are not output from the output ports S1b and S2b, and the parking switch valve 32 is locked in the right half position to maintain the parking release state. In such case, because the linear solenoid valves SL1 and SL2 are turned on and the linear solenoid valves SL3, SL4, and SL5 are turned off, the engagement pressure $P_{SL1}$ is supplied from the output port SL1b to the hydraulic servo 51 to engage the first clutch C-1, and the engagement pressure $P_{SL3}$ is supplied from the output port SL3b to the hydraulic servo 53 to engage the third clutch C-3. Consequently, the third forward speed is achieved.

In the fourth forward speed, the parking release state is maintained as described above. In such case, because the linear solenoid valves SL1, SL2, SL3, and SL4 are turned on and the linear solenoid valve SL5 is turned off, the engagement pressure $P_{SL1}$ is supplied from the output port SL1b to the hydraulic servo 51 to engage the first clutch C-1, and the engagement pressure $P_{SL4}$ is supplied from the output port SL4b to the hydraulic servo 54 to engage the fourth clutch C-4. Consequently, the fourth forward speed is achieved.

In the fifth forward speed, the parking release state is maintained as described above. In such case, because the linear solenoid valves SL1 and SL3 are turned on and the linear solenoid valves SL2, SL4, and SL5 are turned off, the engagement pressure $P_{SL1}$ is supplied from the output port SL1b of the linear solenoid valve SL1 to the hydraulic servo 51, thus engaging the first clutch C-1. Furthermore, the engagement pressure $P_{SL2}$ is output from the output port SL2b of the linear solenoid valve SL2 to the input port 38b of the sorting switch valve 38. At such time, the first solenoid valve S1 is not turned on and the signal pressure $P_{S1}$ does not act on the first control oil chamber 38a of the sorting switch valve 38. In this state, the engagement pressure $P_{SL1}$ from the output port SL1b acts on the second control oil chamber 38h, such that the spool 38p takes the right half position. Therefore, the engagement pressure $P_{SL2}$ is supplied to the hydraulic servo 52 through the output port 38g, thus engaging the second clutch C-2. Consequently, the fifth forward speed is achieved.

In the sixth forward speed, the parking release state is maintained as described above. In such case, because the linear solenoid valves SL3 and SL4 are turned on and the linear solenoid valves SL1, SL2, and SL5 are turned off, the engagement pressure $P_{SL4}$ is supplied from the output port SL4b of the linear solenoid valve SL4 to the hydraulic servo 54, thus engaging the fourth clutch C-4. Furthermore, the engagement pressure $P_{SL2}$ is output from the output port SL2b of the linear solenoid valve SL2 to the input port 38b of the sorting switch valve 38, and the sorting switch valve 38 is locked due to the difference in the pressure-receiving areas of the large- and small-diameter land portions so that the spool 38p takes the right half position. Therefore, the engagement pressure $P_{SL2}$ is supplied to the hydraulic servo 52, thus engaging the second clutch C-2. Consequently, the sixth forward speed is achieved.

In the seventh forward speed, the parking release state is maintained as described above. In such case, because the linear solenoid valves SL1 to SL5 are all turned off, the engagement pressure $P_{SL3}$ is supplied from the output port SL3b of the linear solenoid valve SL3 to the hydraulic servo 53, thus engaging the third clutch C-3. Furthermore, with respect to the linear solenoid valve SL2, the engagement pressure $P_{SL2}$ is output to the input port 38b of the sorting switch valve 38, and the sorting switch valve 38 takes the right half position as described above. Therefore, the engagement pressure $P_{SL2}$ is supplied to the hydraulic servo 52, thus engaging the second clutch C-2. Consequently, the seventh forward speed is achieved.

In the eighth forward speed, the parking release state is maintained as described above. In such case, because the linear solenoid valves SL1, SL2, and SL4 are turned off and the linear solenoid valves SL3 and SL5 are turned on, the engagement pressure $P_{SL5}$ is supplied from the output port SL5b of the linear solenoid valve SL5 to the hydraulic servo 61, thus engaging the first brake B-1. Furthermore, with respect to the linear solenoid valve SL2, the engagement pressure $P_{SL2}$ is output to the input port 38b, and the sorting switch valve 38 takes the right half position as described above. Therefore, the engagement pressure $P_{SL2}$ is supplied to the hydraulic servo 52, thus engaging the second clutch C-2. Consequently, the eighth forward speed is achieved.

Operation for All-Solenoid-Valves-Off Failure

The operation when an all-solenoids-off failure occurs in the second embodiment will be explained with reference to FIGS. 7 and 8.

If the all-solenoids-off failure mode occurs while the vehicle is traveling in the forward range and all of the solenoid valves are turned off, the normally-open third solenoid valve S3 outputs the signal pressure $P_{S3}$, and the normally-open linear solenoid valves SL2 and SL3 can output the engagement pressures $P_{SL2}$ and $P_{SL3}$. Meanwhile, the other solenoid valves stop their output of signal pressures and engagement pressures.

The energized third solenoid valve S3 causes the signal pressure $P_{S3}$ to be output from the output port S3b to the input port 38e of the sorting switch valve 38. At such time, the sorting switch valve 38 is locked to the right half position based on the difference in the pressure-receiving areas of the large-diameter land portion and the small-diameter land portion as described above. Therefore, the signal pressure $P_{S3}$ is cut off from the input port 38e. Therefore, the source pressure switch valve 37 is held in the left half position, and the line pressure $P_L$ that is input to the input port 37b is supplied to all the linear solenoid valves SL1 to SL5 from the output port 37c.

In such case, because the normally open linear solenoid valves SL2 and SL3 are turned off, the engagement pressure $P_{SL3}$ is supplied from the output port SL3b of the linear solenoid valve SL3 to the hydraulic servo 53, thus engaging the third clutch C-3. Furthermore, the engagement pressure $P_{SL2}$ is output from the output port SL2b of the linear solenoid valve SL2 to the input port 38b of the sorting switch valve 38. At such time, the spool 38p of the sorting switch valve 38 is locked in the right half position. Therefore, the engagement pressure $P_{SL2}$ that acts on the input port 38b is supplied to the hydraulic servo 52 through the output port 38g, thus engaging the second clutch C-2. Consequently, the seventh forward speed is achieved.

As explained above, the second clutch C-2 and the third clutch C-3 engage in this embodiment as well to form the seventh forward speed when the all-solenoids-off failure mode occurs while the vehicle travels in the forward range.

However, the all-solenoids-off failure mode may be activated during travel that uses engine braking in the first forward speed. In such case, the first solenoid valve S1 being energized before the all-solenoids-off failure caused the signal pressure $S_1$ to be input to the first control oil chamber 38a of the sorting switch valve 38, such that the spool 38p is already placed in the left half position before the failure occurs. Therefore, even if the signal pressure $P_{S3}$ acts on the input port 38e because the third solenoid valve S3 is off during the all-solenoids-off failure, the line pressure $P_{S3}$ is not blocked. The signal pressure $P_{S3}$ is input to the control oil chamber 37a through the oil passage $k_1$, thus placing the spool 37p in the right half position. Consequently, the line pressure $P_L$ from the input port 37b is cut off, and the automatic transmission shifts to the N range.

If the all-solenoids-off failure mode occurs while the vehicle is in the P range and all of the solenoid valves are turned off, the normally-open third solenoid valve S3 outputs the signal pressure $P_{S3}$, and the normally-open linear solenoid valves SL2 and SL3 can output the engagement pressures $P_{SL2}$ and $P_{SL3}$. Meanwhile, the other solenoid valves stop their output of signal pressures and engagement pressures.

At such time, the parking switch valve 32 is held in the left half position and the parking device 9 maintains the parking state. The de-energized third solenoid valve S3 causes the signal pressure $P_{S3}$ to be output from the output port S3b to the input port 38e of the sorting switch valve 38. In the P range, the linear solenoid valve SL1 is already off before the all-solenoids-off failure occurs, such that the engagement pressure $P_{SL1}$ from the output port S1b does not act on the second control oil chamber 38h and the spool 38p is placed in the left half position. Consequently, the signal pressure $P_{S3}$ that acts on the input port 38e is not blocked. The signal pressure PS3 is input to the control oil chamber 37a through the oil passage $k_1$, thus placing the spool 37p in the right half position. Consequently, the line pressure $P_L$ from the input port 37b is cut off, and the P range is achieved.

Thus, when the vehicle experiences the all-solenoids-off failure mode in the P range, none of the first to fourth clutches C-1 to C-4 nor the first and second brakes B-1 and B2 is engaged. Therefore, the P range is maintained.

If the all-solenoids-off failure mode occurs while the vehicle is in the R range and all of the solenoid valves are turned off, the normally-open third solenoid valve S3 outputs the signal pressure $P_{S3}$, and the normally-open linear solenoid valves SL2 and SL3 can output the engagement pressures $P_{SL2}$ and $P_{SL3}$. Meanwhile, the other solenoid valves stop their output of signal pressures and engagement pressures.

At such time, the line pressure $P_L$ continues to be input to the input port 32b, such that the spool 32p of the parking switch valve 32 is locked in the right half position. Consequently, the parking device 9 maintains the parking release state. The de-energized third solenoid valve S3 causes the signal pressure $P_{S3}$ to be output from the output port S3b to the input port 38e of the sorting switch valve 38. The first solenoid valve S1 is turned on upon switching to the R range before the all-solenoids-off failure occurs, such that the signal pressure $P_{S1}$ is input to the first control oil chamber 38a and the spool 38p takes the left half position. Consequently, the signal pressure $P_{S3}$ is output to the control oil chamber 37a of the source pressure switch valve 37 from the output port 38d. Thus, the spool 37p of the source pressure switch valve 37 takes the right half position and cuts off the line pressure $P_L$. Therefore, the line pressure $P_L$ is not supplied to any of the linear solenoid valves SL1 to SL5 and the N range is achieved.

Thus, when the vehicle experiences the all-solenoids-off failure mode in the R range, none of the first to fourth clutches C-1 to C-4 nor the first and second brakes B-1 and B2 is engaged. Therefore, the automatic transmission shifts to the N range.

If the all-solenoids-off failure mode occurs while the vehicle is in the N range, all of the solenoid valves are turned off and the normally-open third solenoid valve S3 outputs the signal pressure $P_{S3}$, so that the normally-open linear solenoid valves SL2 and SL3 can output the engagement pressures $P_{SL2}$ and $P_{SL3}$. Meanwhile, the other solenoid valves stop their output of signal pressures and engagement pressures.

At such time, the line pressure $P_L$ continues to be input to the input port 32b, such that the parking switch valve 32 is locked. Consequently, the parking device 9 maintains the parking release state. The de-energized third solenoid valve S3 causes the signal pressure $P_{S3}$ to be output from the output port S3b to the input port 38e of the sorting switch valve 38, such that the spool 38p takes the left half position for the same reason as in the case of the R range explained above. Consequently, the signal pressure $P_{S3}$ that is input to the input port 38e is output to the control oil chamber 37a from the output port 38d. Thus, the spool 37p of the source pressure switch valve 37 takes the right half position and cuts off the line pressure $P_L$. Therefore, the line pressure $P_L$ is not supplied to any of the linear solenoid valves SL1 to SL5 and the N range is achieved.

Thus, when the vehicle experiences the all-solenoids-off failure mode in the N range, none of the first to fourth clutches C-1 to C-4 nor the first and second brakes B-1 and B2 is engaged. Therefore, the N range is maintained.

As described above, according to the second embodiment, in any of the first to eighth forward speeds and excluding engine braking in the first forward speed, the seventh forward speed (a predetermined forward gear speed) is formed if the all-solenoids-off failure mode occurs to ensure the vehicle's travel. If the all-solenoids-off failure mode occurs when the vehicle is in the P range, R range, or N range, the seventh forward speed (the predetermined forward gear speed) is not formed; instead, the P range is maintained if in the P range; the N range is switched to if in the R range; and the N range is maintained if in the N range. Thus, the running safety of the vehicle is secured. When the engine is stopped, all supply of the line pressure $P_L$, i.e., the source pressure, is also stopped. Therefore, even if the sorting switch valve 38 is locked in the right half position during engine driving, the spool 38$p$ returns to the left half position. Consequently, although the third solenoid valve S3 outputs pressure and the valves operate, the source pressure for all the linear solenoid valves SL1 to SL5 is cut off, thus achieving the parking state or the neutral state without forming the seventh forward speed.

Third Embodiment

Figure 9:
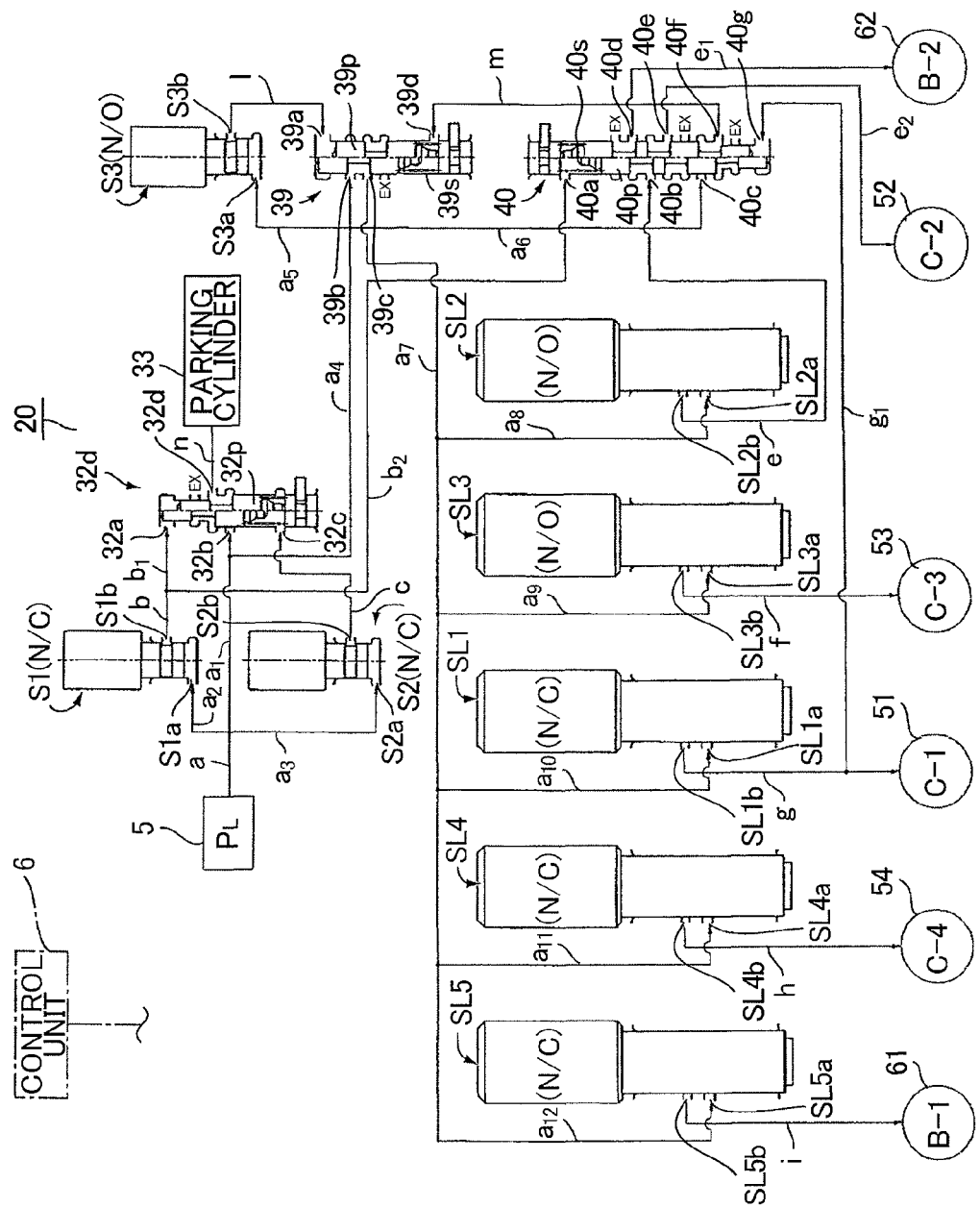
FIG. 9 is a schematic diagram that shows a hydraulic control device for a third embodiment according to the present invention.

A third embodiment that partially modifies the first embodiment described above will be explained now with reference to FIG. 9. In the third embodiment, a source pressure switch valve 39 and a sorting switch valve 40 shown in FIG. 9 are used in place of the source pressure switch valve 35 and the sorting switch valve 36, and the linear solenoid valves SL2 and SL3 are normally-open types. Note that the third embodiment differs from the previous first embodiment only in terms of the above valve configuration, and other portions are generally identical. Therefore, main portions will be indicated with the same reference symbols and not explained here.

The source pressure switch valve 39 in the third embodiment includes a first control oil chamber 39$a$ that inputs the signal pressure $P_{S3}$ that is output from the output port S3$b$ of the third solenoid valve S3 through an oil passage l when an all-solenoids-off failure occurs; an input port 39$b$ that is input with the line pressure $P_L$; an output port 39$c$; an exhaust port EX; a second control oil chamber 39$d$ (a first lock pressure input oil chamber); a spool 39$p$; and a spring 39$s$ that biases the spool 39$p$ upward in the figure. When the signal pressure $P_{S3}$ from the output port S3$b$ of the third solenoid valve S3 acts on the control oil chamber 39$a$, the spool 39$p$ moves downward in the figure against the spring 39$s$ to take the right half position. However, the spool 39$p$ moves upward in the figure to take the left half position when the signal pressure $P_{S3}$ does not act on the first control oil chamber 39$a$, or when, even if the signal pressure $P_{S3}$ acts on the first control oil chamber 39$a$, a signal pressure $P_{40}$ (a lock pressure) from an output port 40$f$ of the sorting switch valve 40 acts on the second control oil chamber 39$d$ through an oil passage m.

The sorting switch valve 40 includes: a first control oil chamber 40$a$ (a lock release pressure input oil chamber) that is input with the signal pressure $P_{S1}$ that is output from the output port S1$b$ of the first solenoid valve S1 (a release signal pressure output solenoid valve) in a branched form; an input port 40$b$ that is input with the engagement pressure $P_{SL2}$ that is output from the output port SL2$b$ of the linear solenoid valve SL2; an input port 40$c$ (a second lock pressure input oil chamber) that is input with the line pressure $P_L$; an output port 40$d$ that outputs the engagement pressure $P_{SL2}$, which was input to the input port 40$b$, to the hydraulic servo 62 with a spool 40$p$ in the left half position; an output port 40$e$ that outputs the engagement pressure $P_{SL2}$, which was input to the input port 40$b$, to the hydraulic servo 52 with the spool 40$p$ in the right half position; an output port 40$f$ that outputs the line pressure $P_L$, which was input to the input port 40$c$ with the spool 40$p$ in the right half position, to the second control oil chamber 39$d$ of the source pressure switch valve 39; the spool 40$p$; and a spring 40$s$ (a biasing mechanism) that biases the spool 40$p$ downward in the figure.

The spool 40$p$ of the sorting switch valve 40 is moved upward in the figure to the right half position when the engagement pressure $P_{SL1}$ is input from the output port SL1$b$ to the second control oil chamber 40$g$ (a forward engagement pressure input oil chamber), without the signal pressure $P_{S1}$ being input from the output port S1$b$ to the first control oil chamber 40$a$. The sorting switch valve 40 has the same configuration as the sorting switch valve 36 described above. Accordingly, when the spool 40$p$ of the sorting switch valve 40 moves upward against the biasing force of the spring 40$s$ to take the right half position, the line pressure $P_L$ is input to the oil chamber from the input port 40$c$. Therefore, based on the difference in the pressure-receiving areas of the large-diameter land portion on the upper side and the small-diameter land portion on the lower side, the spool 40$p$ is biased in a direction opposite the biasing direction of the spring 40$s$, namely upward in the figure, by a force stronger than the biasing force of the spring 40$s$ and thus locked. Furthermore, when the signal pressure $P_{S1}$ is input from the output port S1$b$ to the first control oil chamber 40$a$ in this locked state, the spool 40$p$ moves downward in the figure to take the left half position.

In the third embodiment, the paths from the line pressure source (the source pressure source) 5 to the oil passages a, $a_1$, $a_4$, $a_6$, and m form a state variable oil passage and a reverse input oil passage.

Operation of Gear Speeds

The operation of the gear speeds according to the hydraulic control device 20 of the third embodiment will be explained now with reference to FIG. 9 and the operation chart for the automatic transmission in FIG. 10.

With respect to the P range, the parking state is achieved through an operation identical to that for the P range in the first embodiment. In such case, the control unit 6 controls the third solenoid valve S3 to on so that the signal pressure $P_{S3}$ from the output port S3$b$ is not output and the spool 39$p$ moves to take the left half position. Therefore, the line pressure $P_L$ that acts on the input port 39$b$ is output to all the linear solenoid valves SL1 to SL5 from the output port 39$c$. However, because the linear solenoid valves SL2 and SL3 are on while the linear solenoid valves SL1, SL4, and SL5 are all off, the engagement pressures $P_{SL1}$ to $P_{SL5}$ are not output and the P range is achieved.

When the shift lever is operated to the R range, the control unit 6 controls the first solenoid valve S1 to on so that the signal pressure $P_{S1}$ is output from the output port S1$b$ and acts on the first control oil chamber 32$a$ of the parking switch valve 32. Therefore, the spool 32$p$ takes the right half position so that the line pressure $P_L$ input to the input port 32$b$ is output from the output 32$d$ to the parking cylinder 33. Consequently, similar to the R range in the first embodiment, the parking release state is achieved and the spool 32$p$ is locked in the right half position.

In this case, the third solenoid valve S3 is turned on, such that the signal pressure $P_{S3}$ does not act on the first control oil chamber 39a of the source pressure switch valve 39 and the spool 39p moves to take the left half position. Therefore, the line pressure $P_L$ that acts on the input port 39b is output to all the linear solenoid valves SL1 to SL5 from the output port 39c. At such time, because the linear solenoid valves SL3 and SL4 are turned on and the linear solenoid valves SL1, SL2, and SL5 are turned off, the adjusted engagement pressure $P_{SL4}$ is supplied from the output port SL4b of the linear solenoid valve SL4 to the hydraulic servo 54, thus engaging the fourth clutch C-4. In addition, the adjusted engagement pressure $P_{SL2}$ is output from the output port SL2b of the linear solenoid valve SL2 and input to the input port 40b of the sorting switch valve 40. At such time, the energized first solenoid valve S1 and the input of the signal pressure $P_{S1}$ to the first control oil chamber 40a causes the sorting switch valve 40 to take the left half position. Therefore, the engagement pressure $P_{SL2}$ that was input to the input port 40b is output to the hydraulic servo 62 from the output port 40d, thus engaging the second brake B-2. Consequently, the engagement of the second brake B-2 in combination with the engagement of the fourth clutch C-4 achieves the reverse speed.

When the shift lever is operated to the N range, similar to the R range, turning the first solenoid valve S1 on causes the parking switch valve 32 to take the right half position, such that the parking release state is achieved. In this case, the third solenoid valve S3 is turned on so that the signal pressure $P_{S3}$ is not output from the output port S3b. Furthermore, the signal pressure $P_{S1}$ is not input to the first control oil chamber 39a and the spool 39p of the source pressure switch valve 39 moves to take the left half position. Therefore, the line pressure $P_L$ that acts on the input port 39b is output to all the linear solenoid valves SL1 to SL5 from the output port 39c. At such time, because the linear solenoid valves SL2 and SL3 are turned on and the linear solenoid valves SL1, SL4, and SL5 are turned off, none of the engagement pressures $P_{SL1}$ to $P_{SL5}$ are output, thus achieving the N range.

In the first forward speed when in the forward range, the control unit 6 controls the first and second solenoid valves S1 and S2 to off, such that both the signal pressures $P_{S1}$ and $P_{S2}$ are not output from the output ports S1b and S2b, and the parking switch valve 32 is locked in the right half position to achieve the parking release state.

In this case, the third solenoid valve S3 is turned on so that the signal pressure $P_{S3}$ from the output port S3b is not output and the source pressure switch valve 39 takes the left half position. Therefore, the line pressure $P_L$ that acts on the input port 39b is output to all the linear solenoid valves SL1 to SL5 from the output port 39c. At such time, because the linear solenoid valves SL1, SL2, and SL3 are turned on and the linear solenoid valves SL4 and SL5 are turned off, the engagement pressure $P_{SL1}$ is supplied from the output port SL1b to the hydraulic servo 51, thus engaging the first clutch C-1. Consequently, the engagement of the first clutch C-1 in combination with the engagement of the one-way clutch F-1 achieves the first forward speed.

During engine braking in the first forward speed, similar to the R and N ranges, turning the first solenoid valve S1 on causes the parking switch valve 32 to take the right half position, such that the parking release state is achieved.

In this case, the third solenoid valve S3 is turned on so that the signal pressure $P_{S3}$ from the output port S3b is not output and the source pressure switch valve 39 takes the left half position. Therefore, the line pressure $P_L$ that acts on the input port 39b is output to all the linear solenoid valves SL1 to SL5 from the output port 39c. At such time, because the linear solenoid valves SL1 and SL3 are turned on and the linear solenoid valves SL2, SL4, and SL5 are turned off, the adjusted engagement pressure $P_{SL1}$ is supplied from the output port SL1b of the linear solenoid valve SL1 to the hydraulic servo 51, thus engaging the first clutch C-1. Furthermore, the adjusted engagement pressure $P_{SL2}$ is output from the output port SL2b of the linear solenoid valve SL2 to the input port 40b of the sorting switch valve 40. And the signal pressure $P_{S1}$ is input to the first control oil chamber 40a of the sorting switch valve 40 from the output port S1b of the first solenoid valve S1, such that the spool 40p moves to take the left half position. Therefore, the engagement pressure $P_{SL2}$ that is input to the input port 40b is supplied to the hydraulic servo 62 through the output port 40d, thus engaging the second brake B-2. Consequently, the engagement of the second brake B-2 in combination with the engagement of the first clutch C-1 achieves engine braking in the first forward speed.

In the second forward speed, the first and second solenoid valves S1 and S2 are turned off, such that both the signal pressures $P_{S1}$ and $P_{S2}$ are not output from the output ports S1b and S2b, and the parking switch valve 32 is locked in the right half position to achieve the parking release state. In such case, because the linear solenoid valves SL1, SL2, SL3, and SL5 are turned on and the linear solenoid valve SL4 is turned off, the engagement pressure $P_{SL1}$ is supplied from the output port SL1b to the hydraulic servo 51 to engage the first clutch C-1, and the engagement pressure $P_{SL5}$ is supplied from the output port SL5b to the hydraulic servo 61 to engage the first brake B-1. Consequently, the second forward speed is achieved.

In the third forward speed, similar to the above, the first and second solenoid valves S1 and S2 are turned off, such that the parking switch valve 32 is locked in the right half position to achieve the parking release state. In such case, because the linear solenoid valves SL1 and SL2 are turned on and the linear solenoid valves SL3, SL4, and SL5 are turned off, the engagement pressure $P_{SL1}$ is supplied from the output port SL1b of the linear solenoid valve S1 to the hydraulic servo 51 to engage the first clutch C-1, and the engagement pressure $P_{SL3}$ is supplied from the output port SL3b of the linear solenoid valve SL3 to the hydraulic servo 53 to engage the third clutch C-3. Consequently, the third forward speed is achieved.

In the fourth forward speed, similar to the above, the first and second solenoid valves S1 and S2 are turned off, such that the parking switch valve 32 is locked in the right half position to achieve the parking release state. In such case, because the linear solenoid valves SL1, SL2, SL3, and SL4 are turned on and the linear solenoid valve SL5 is turned off, the engagement pressure $P_{SL1}$ is supplied from the output port SL1b of the linear solenoid valve S1 to the hydraulic servo 51 to engage the first clutch C-1, and the engagement pressure $P_{SL4}$ is supplied from the output port SL4b of the linear solenoid valve SL4 to the hydraulic servo 54 to engage the fourth clutch C-4. Consequently, the fourth forward speed is achieved.

In the fifth forward speed, similar to the above, the first and second solenoid valves S1 and S2 are turned off, such that the parking switch valve 32 is locked in the right half position to achieve the parking release state. In such case, because the linear solenoid valves SL1 and SL3 are turned on and the linear solenoid valves SL2, SL4, and SL5 are turned off, the engagement pressure $P_{SL1}$ is supplied from the output port SL1b of the linear solenoid valve SL1 to the hydraulic servo 51, thus engaging the first clutch C-1. Furthermore, the engagement pressure $P_{SL2}$ is output from the output port SL2b of the linear solenoid valve SL2 to the input port 40b of the sorting switch valve 40. At such time, the first solenoid valve 51 is not turned on and the signal pressure $P_{S1}$ does not act on the first control oil chamber 40a of the sorting switch valve 40. In this state, the engagement pressure $P_{SL1}$ from the output port SL1$b$ acts on the second control oil chamber 40$g$. Therefore, the engagement pressure P$_{SL2}$ that is input to the input port 40$b$ is supplied to the hydraulic servo 52 through the output port 40$e$, thus engaging the second clutch C-2. Consequently, the fifth forward speed is achieved.

In the sixth forward speed, similar to the above, the first and second solenoid valves S1 and S2 are turned off, such that the parking switch valve 32 is locked in the right half position to achieve the parking release state. In such case, because the linear solenoid valves SL3 and SL4 are turned on and the linear solenoid valves SL1, SL2, and SL5 are turned off, the engagement pressure P$_{SL4}$ is supplied from the output port SL4$b$ to the hydraulic servo 54, thus engaging the fourth clutch C-4. Furthermore, the engagement pressure P$_{SL2}$ is output from the output port SL2$b$ to the input port 40$b$ of the sorting switch valve 40. At such time, the sorting switch valve 40 is locked in the right half position based on the difference in the pressure-receiving areas of the large-diameter land portion and the small-diameter land portion as described above. Therefore, the spool 40$p$ takes the right half position, and the engagement pressure P$_{SL2}$ that is input to the input port 40$b$ is supplied to the hydraulic servo 52 through the output port 40$e$, thus engaging the second clutch C-2. Consequently, the sixth forward speed is achieved.

In the seventh forward speed, similar to the above, the first and second solenoid valves S1 and S2 are turned off, such that the parking switch valve 32 is locked in the right half position to achieve the parking release state. In such case, because the linear solenoid valves SL1 to SL5 are all turned off, the engagement pressure P$_{SL3}$ is supplied from the output port SL3$b$ of the linear solenoid valve SL3 to the hydraulic servo 53, thus engaging the third clutch C-3. Furthermore, the adjusted engagement pressure P$_{SL2}$ is output from the output port SL2$b$ of the linear solenoid valve SL2 to the input port 40$b$ of the sorting switch valve 40. At such time, the spool 40$p$ of the sorting switch valve 40 takes the right half position, similar to the sixth forward speed. Therefore, the engagement pressure P$_{SL2}$ that is input to the input port 40$b$ is supplied to the hydraulic servo 52 through the output port 40$e$, thus engaging the second clutch C-2. Consequently, the seventh forward speed is achieved.

In the eighth forward speed, similar to the above, the first and second solenoid valves S1 and S2 are turned off, such that the parking switch valve 32 is locked in the right half position to achieve the parking release state. In such case, because the linear solenoid valves SL1, SL2, and SL4 are turned off and the linear solenoid valves SL3 and SL5 are turned on, the adjusted engagement pressure P$_{SL5}$ is supplied from the output port SL5$b$ of the linear solenoid valve SL5 to the hydraulic servo 61, thus engaging the first brake B-1. Furthermore, the adjusted engagement pressure P$_{SL2}$ is output from the output port SL2$b$ of the linear solenoid valve SL2 to the input port 40$b$ of the sorting switch valve 40. At such time, the spool 40$p$ of the sorting switch valve 40 takes the right half position, similar to the sixth forward speed. Therefore, the engagement pressure P$_{SL2}$ that is input to the input port 40$b$ is supplied to the hydraulic servo 52 through the output port 40$e$, thus engaging the second clutch C-2. Consequently, the eighth forward speed is achieved.

Operation for All-Solenoid-Valves-Off Failure

The operation when an all-solenoids-off failure occurs in the third embodiment will be explained with reference to FIGS. 9 and 10.

If the all-solenoids-off failure mode occurs while the vehicle is traveling in the forward range and all of the solenoid valves are turned off, the normally-open third solenoid valve S3 outputs the signal pressure P$_{S3}$, and the normally-open linear solenoid valves SL2 and SL3 can output the engagement pressures P$_{SL2}$ and P$_{SL3}$. Meanwhile, the other solenoid valves stop their output of signal pressures and engagement pressures.

The signal pressure P$_{S3}$ of the de-energized third solenoid valve S3 acts on the first control oil chamber 39$a$ of the source pressure switch valve 39, such that the spool 39$p$ moves to take the right half position. At such time, the line pressure P$_L$ continues to act on the input port 40$c$, and the sorting switch valve 40 is locked in the right half position based on the difference in the pressure-receiving areas as explained above. Therefore, a signal pressure P$_{40}$ that is based on the line pressure PL is output to the second control oil chamber 39$d$ from the output port 40$f$, which biases the spool 39$p$ upward in the figure and holds the spool 39$p$ in the left half position. Consequently, the line pressure P$_L$ that is input to the input port 39$b$ is supplied to all the linear solenoid valves SL1 to SL5 from the output port 39$c$.

In such case, because the normally open linear solenoid valves SL2 and SL3 are turned off, the engagement pressure P$_{SL3}$ is supplied from the output port SL3$b$ of the linear solenoid valve SL3 to the hydraulic servo 53, thus engaging the third clutch C-3. Furthermore, the engagement pressure P$_{SL2}$ is output from the output port SL2$b$ of the linear solenoid valve SL2 to the input port 40$b$ of the sorting switch valve 40. At such time, the spool 40$p$ takes the right half position. Therefore, the engagement pressure P$_{SL2}$ that is input to the input port 40$b$ is supplied to the hydraulic servo 52 through the output port 40$e$, thus engaging the second clutch C-2. Consequently, the seventh forward speed is achieved.

As explained above, the second clutch C-2 and the third clutch C-3 engage in this embodiment as well to form the seventh forward speed when the all-solenoids-off failure mode occurs while the vehicle travels in the forward range.

However, the all-solenoids-off failure mode may be activated during travel that uses engine braking in the first forward speed. In such case, the first solenoid valve S1 is already energized before the all-solenoids-off failure occurs. Therefore, the signal pressure P$_{S1}$ is input to the first control oil chamber 40$a$ of the sorting switch valve 40, such that the spool 40$p$ is placed in the left half position and the line pressure P$_L$ that acts on the input port 40$c$ is cut off. Consequently, the signal pressure P$_{40}$ does not act on the second control oil chamber 39$d$. Therefore, the spool 39$p$ of the source pressure switch valve 39 takes the right half position, and the line pressure P$_L$ that acts on the input port 39$b$ is cut off and not supplied to any of the linear solenoid valves SL1 to SL5. Consequently, the automatic transmission shifts to the N range.

If the all-solenoids-off failure mode occurs while the vehicle is in the P range and all of the solenoid valves are turned off, the normally-open third solenoid valve S3 outputs the signal pressure P$_{S3}$, and the normally-open linear solenoid valves SL2 and SL3 can output the engagement pressures P$_{SL2}$ and P$_{SL3}$. Meanwhile, the other solenoid valves stop their output of signal pressures and engagement pressures.

At such time, the spool 32$p$ of the parking switch valve 32 takes the left half position and the parking device 9 maintains the parking state. The de-energized third solenoid valve S3 causes the signal pressure P$_{S3}$ to be output from the output port S3$b$ to the first control oil chamber 39$a$, such that the spool 39$p$ takes the right half position. For this reason, the line pressure P$_L$ that acts on the input port 39$b$ is cut off. Therefore, the line pressure P$_L$ is not supplied to any of the linear solenoid valves SL1 to SL5, and the P range is consequently achieved.

Thus, when the vehicle experiences the all-solenoids-off failure mode in the P range, none of the first to fourth clutches C-1 to C-4 nor the first and second brakes B-1 and B2 is engaged. Therefore, the P range is maintained.

If the all-solenoids-off failure mode occurs while the vehicle is in the R range and all of the solenoid valves are turned off, the normally-open third solenoid valve S3 outputs the signal pressure $P_{S3}$, and the normally-open linear solenoid valves SL2 and SL3 can output the engagement pressures $P_{SL2}$ and $P_{SL3}$. Meanwhile, the other solenoid valves stop their output of signal pressures and engagement pressures.

At such time, the line pressure $P_L$ continues to be input to the input port 32b, such that the spool 32p of the parking switch valve 32 is locked in the right half position. Consequently, the parking device 9 maintains the parking release state. The de-energized third solenoid valve S3 causes the signal pressure $P_{S3}$ to be output from the output port S3b to the first control oil chamber 39a. The first solenoid valve S1 is turned on upon switching to the R range before the all-solenoids-off failure occurs, such that the signal pressure PS1 is input to the first control oil chamber 40a and the sorting switch valve 40 takes the left half position and the signal pressure $P_{40}$ is not output to the second control oil chamber 39d from the output port 40f. The spool 39p is thus placed in the right half position due to the input of the signal pressure $P_{S3}$ to the first control oil chamber 39a and the line pressure $P_L$ is cut off. Therefore, the line pressure $P_L$ is not supplied to any of the linear solenoid valves SL1 to SL5, and the N range is consequently achieved.

Thus, when the vehicle experiences the all-solenoids-off failure mode in the R range, none of the first to fourth clutches C-1 to C-4 nor the first and second brakes B-1 and B2 is engaged. Therefore, the automatic transmission changes to the N range.

If the all-solenoids-off failure mode occurs while the vehicle is in the N range and all of the solenoid valves are turned off, the normally-open third solenoid valve S3 outputs the signal pressure $P_{S3}$, and the normally-open linear solenoid valves SL2 and SL3 can output the engagement pressures $P_{SL2}$ and $P_{SL3}$ Meanwhile, the other solenoid valves stop their output of signal pressures and engagement pressures.

At such time, the line pressure $P_L$ continues to be input to the input port 32b, such that the spool 32p of the parking switch valve 32 is locked in the right half position. Consequently, the parking device 9 maintains the parking release state. The de-energized third solenoid valve S3 causes the signal pressure $P_{S3}$ to be output from the output port S3b to the first control oil chamber 39a, such that the sorting switch valve 40 takes the left half position for the same reason as in the case of the R range explained above and the signal pressure $P_{40}$ is not output to the second control oil chamber 39d. The spool 39p is thus placed in the right half position due to the input of the signal pressure $P_{S3}$ and the line pressure $P_L$ is cut off. Therefore, the line pressure $P_L$ is not supplied to any of the linear solenoid valves SL1 to SL5, and the N range is consequently achieved.

Thus, when the vehicle experiences the all-solenoids-off failure mode in the N range, none of the first to fourth clutches C-1 to C-4 nor the first and second brakes B-1 and B2 is engaged. Therefore, the N range is maintained.

As described above, according to the third embodiment, in any of the first to eighth forward speeds and excluding engine braking in the first forward speed, the seventh forward speed (a predetermined forward gear speed) is formed if the all-solenoids-off failure mode occurs to ensure the vehicle's travel. If the all-solenoids-off failure mode occurs when the vehicle is in the P range, R range, or N range, the P range is maintained if in the P range; the N range is switched to if in the R range; and the N range is maintained if in the N range. Thus, the running safety of the vehicle is secured. When the engine is stopped, all supply of the line pressure $P_L$, i.e., the source pressure, is also stopped. Therefore, even if the sorting switch valve 40 is locked in the right half position during engine driving, the spool 40p returns to the left half position. Consequently, the line pressure $P_L$ of the input port 40c is cut off, and the third solenoid valve S3 outputs pressure to operate the source pressure switch valve 39. The source pressure for all the linear solenoid valves SL1 to SL5 is also cut off, thus achieving the parking state or the neutral state without forming the seventh forward speed.

Overview of the Invention

As described above, according to the present invention, the hydraulic control device 20 is configured so as to achieve a first state that can form all the gear speeds using all the linear solenoid valves SL1 to SL5; a second state that supplies the engagement pressures $P_{SL2}$ and $P_{SL3}$ to the hydraulic servos 52 and 53 through the linear solenoid valves SL2 and SL3 when an all-solenoids-off failure occurs; and a third state that completely cuts off the source pressure to all the linear solenoid valves SL1 to SL5 when an all-solenoids-off failure occurs. The hydraulic control device 20 includes state variable oil passages (d, $d_1$, $d_2$, $d_3$, $d_4$), (k, $k_1$), or (a, $a_1$, $a_4$, $a_6$, m) that pass through the sorting switch valve 36, 38, or 40 and modify the second state and the third state depending on a pressure output state. Furthermore, the second state is achieved when an all-solenoids-off failure occurs while the sorting switch valve 36, 38, or 40 is in a second position (the right half position), and the third state is achieved when all-solenoids-off failure occurs while the sorting switch valve 36, 38, or 40 is in a first position (the left half position).

Accordingly, a configuration is employed in which the state variable oil passages (d, $d_1$, $d_2$, $d_3$, $d_4$), (k, $k_1$), or (a, $a_1$, $a_4$, $a_6$, m) pass through the sorting switch valve 36, 38, or 40, which allocates the engagement pressure $P_{SL2}$ from the linear solenoid valve SL2 to the hydraulic servos 52 and 62. Consequently, the number of valves can be reduced, and travel can be secured that shifts to the seventh forward speed (a predetermined forward gear speed) using the hydraulic servos 52 and 53 if the all-solenoids-off failure mode occurs while running in a forward gear speed, excluding engine braking in the first forward speed. Also, if the all-solenoids-off failure mode occurs in the P range, R range, or N range, or when using the engine brake in the first forward speed (a specific gear speed), the source pressure is completely cut off from all the linear solenoid valves SL1 to SL5 so that the automatic transmission does not shift to the seventh forward speed. Therefore, the P range is maintained if in the P range; the N range is switched to if in the R range; the N range is maintained if in the N range; and the N range is switched to if engine braking in the first forward speed. Consequently, it is possible to reliably prevent a problem such as switching to a driving state unintended by the driver and losing the driver's trust.

According to the present invention, the hydraulic control device 20 includes: the source pressure switch valve 35, which switches between a supply position (the left half position in FIG. 5) that supplies the line pressure $P_L$ as a source pressure to the linear solenoid valves SL1 to SL5 and a reverse input position (the right half position in FIG. 5) that inputs the reverse input pressure $P_{35d}$ to the exhaust ports SL2c and SL3c of the linear solenoid valves SL2 and SL3 through the sorting switch valve 36; and the third solenoid valve S3 (the signal pressure output solenoid valve) that outputs the signal pressure $P_{S3}$, which switches the source pressure switch valve 35 to the reverse input position (the right half position) when an all-solenoids-off failure occurs. The state variable oil passage is configured by a reverse input oil passage that is formed from the oil passages d and $d_1$ to $d_4$, which pass through the sorting switch valve 36 from the source pressure switch valve 35 and communicate the reverse input pressure $P_{35d}$ to the exhaust ports SL2c and SL3c of the linear solenoid valves SL2 and SL3. Furthermore, the sorting switch valve 36 is configured so as to communicate with the reverse input oil passage when in the second position (the right half position), and block the reverse input oil passage when in the first position (the left half position).

Accordingly, by switching the sorting switch valve 36, which allocates the engagement pressure $P_{SL2}$ from the linear solenoid valve SL2 to the hydraulic servos 52 and 62, between the second position (the right half position in FIG. 5) and the first position (the left half position in FIG. 5), it is possible to reliably switch between the open and closed states of the reverse input oil passage (d, $d_1$ to $d_4$). Consequently, the number of valves can be reduced, and travel can be secured that shifts to the seventh forward speed using the hydraulic servos 52 and 53 if the all-solenoids-off failure mode occurs while running in a forward gear speed, excluding engine braking in the first forward speed. Also, if the all-solenoids-off failure mode occurs in the P range, R range, or N range, or when using the engine brake in the first forward speed, the source pressure is completely cut off from all the linear solenoid valves SL1 to SL5 so that the automatic transmission does not shift to the seventh forward speed. Thus, a function that can form the seventh forward speed and a range other than the seventh forward speed in the event of an all-solenoids-off failure can be achieved by the source pressure switch valve 35 and the sorting switch valve 36 without increasing the number of valves, and the hydraulic circuit configuration can be simplified.

According to the present invention, the hydraulic control device 20 includes: the source pressure switch valve 37, which switches between a supply position (the left half position in FIG. 7) that supplies the line pressure $P_L$ as a source pressure to the linear solenoid valves SL1 to SL5 and a cut-off position (the right half position in FIG. 7) that cuts off the line pressure $P_L$; and the third solenoid valve S3 (the signal pressure output solenoid valve) that outputs the signal pressure $P_{S3}$, which switches the source pressure switch valve 37 to the cut-off position (the right half position in FIG. 7) when an all-solenoids-off failure occurs. The state variable oil passage is configured by a signal pressure oil passage that is formed from the oil passages k and $k_1$, which pass through the sorting switch valve 38 from the third solenoid valve S3 and communicate the signal pressure $P_{S3}$ to the source pressure switch valve 37. Furthermore, the sorting switch valve 38 is configured so as to block the signal pressure oil passage when in the second position (the right half position), and communicate with the signal pressure oil passage when in the first position (the left half position).

Accordingly, by switching the sorting switch valve 38, which allocates the engagement pressure $P_{SL2}$ from the linear solenoid valve SL2 to the hydraulic servos 52 and 62, between the second position (the right half position in FIG. 7) and the first position (the left half position in FIG. 7), it is possible to reliably switch between the open and closed states of the signal pressure oil passage. Consequently, the number of valves can be reduced, and travel can be secured that shifts to the seventh forward speed using the hydraulic servos 52 and 53 if the all-solenoids-off failure mode occurs while running in a forward gear speed, excluding engine braking in the first forward speed. Also, if the all-solenoids-off failure mode occurs in the P range, R range, or N range, or when using the engine brake in the first forward speed, the source pressure is completely cut off from all the linear solenoid valves SL1 to SL5 so that the automatic transmission does not shift to the seventh forward speed. Thus, a function that can form the seventh forward speed and a range other than the seventh forward speed in the event of an all-solenoids-off failure can be achieved by the source pressure switch valve 37 and the sorting switch valve 38 without increasing the number of valves, and the hydraulic circuit configuration can be simplified.

According to the present invention, the sorting switch valves 36 and 38 respectively include: the springs 36s and 38s that bias the spools 36p and 38p so as to take a first position (the left half position in FIGS. 5 and 7); the second control oil chambers 36h and 38h (the forward engagement pressure input oil chamber) that are input with the engagement pressure $P_{SL1}$, which is supplied to the hydraulic servo 51 of the first clutch C-1 that is engaged during forward travel, and switches the spools 36p and 38p to a second position (the right half position in FIGS. 5 and 7) against the biasing force of the springs 36s and 38s; the input ports 36c and 38c (the second lock pressure input oil chamber) that are input with the line pressure $P_L$ as a lock pressure when in the second position (the right half position) to lock the spools 36p and 38p in the second position (the right half position); and the first control oil chambers 36a and 38a (the lock release pressure input oil chamber) that is input with the signal pressure $P_{S1}$ as a lock release pressure that returns the spools 36p and 38p locked in the second position (the right half position) to the first position (the left half position). When the line pressure $P_L$ serving as the source pressure is stopped, the biasing force of the springs 36s and 38s return the spools 36p and 38p to the first position (the left half position). A simple configuration is thus achieved where the engagement pressure $P_{SL1}$ is input to the second control oil chambers 36h and 38h, and the signal pressure $P_{S1}$ is input as a lock release pressure to the first control oil chambers 36a and 38a. Therefore, when engine driving is stopped and the source pressure ($P_L$) also stopped, the biasing force of the springs 36s and 38s can return the spools 36p and 38p to the first position (the left half position). Consequently, a hydraulic circuit with a simple configuration can be achieved for a more compact hydraulic control device 20.

According to the present invention, the hydraulic control device 20 includes: the source pressure switch valve 39 that switches between a supply position (the left half position in FIG. 9) that supplies the line pressure $P_L$ as a source pressure to the linear solenoid valves SL1 to SL5 and a cut-off position (the right half position in FIG. 9) that cuts off the line pressure $P_L$, and has the second control oil chamber 39d (the first lock pressure input oil chamber) that is input with the line pressure $P_L$ as a lock pressure ($P_{40}$) to lock the sorting switch valve 39 to the supply position (the left half position); and the third solenoid valve S3 (the signal pressure output solenoid valve) that outputs the signal pressure $P_{S3}$, which switches the source pressure switch valve 39 to the cut-off position (the right half position) when an all-solenoids-off failure occurs. The sorting switch valve 40 has the input port 40c (a second lock pressure input oil chamber) that is input with the line pressure $P_L$ as a lock pressure when in the second position (the right half position in FIG. 9) to lock the sorting switch valve 40 in the second position (the right half position). The state variable oil passage is configured by a lock pressure oil passage that is formed from the oil passages a, $a_1$, $a_4$, $a_6$, and m, which communicate the lock pressure ($P_L$) to the second control oil chamber 39d (the first lock pressure input oil chamber) of the source pressure switch valve 39 through the input port 40c of the sorting switch valve 40. Furthermore, the sorting switch valve 40 is configured so as to communicate with the lock pressure oil passage when in the second position (the right half position), and block the lock pressure oil passage when in the first position (the left half position).

Accordingly, by switching the sorting switch valve 40, which allocates the engagement pressure $P_{SL2}$ from the linear solenoid valve SL2 to the hydraulic servos 52 and 62, between the second position (the right half position in FIG. 9) and the first position (the left half position in FIG. 9), it is possible to reliably switch between the open and closed states of the lock pressure oil passage. Consequently, the number of valves can be reduced, and travel can be secured that shifts to the seventh forward speed using the hydraulic servos 52 and 53 if the all-solenoids-off failure mode occurs while running in a forward gear speed, excluding engine braking in the first forward speed. Also, if the all-solenoids-off failure mode occurs in the P range, R range, or N range, or when using the engine brake in the first forward speed, the source pressure is completely cut off from all the linear solenoid valves SL1 to SL5 so that the automatic transmission does not shift to the seventh forward speed. Thus, a function that can form the seventh forward speed and a range other than the seventh forward speed in the event of an all-solenoids-off failure can be achieved by the source pressure switch valve 39 and the sorting switch valve 40 without increasing the number of valves, and the hydraulic circuit configuration can be simplified.

According to the present invention, the sorting switch valve 40 includes: the spring 40s (the biasing mechanism) that biases the spool 40p so as to take a first position (the left half position in FIG. 9); the second control oil chamber 40g (the forward engagement pressure input oil chamber) that is input with the engagement pressure $P_{SL1}$, which is supplied to the hydraulic servo 51 of the first clutch C-1 that is engaged during forward travel, and switches the spool 40p to a second position (the right half position in FIG. 9) against the biasing force of the spring 40s; and the first control oil chamber 40a (the lock release pressure input oil chamber) that is input with the signal pressure $P_{S1}$ as a lock release pressure that returns the spool 40p locked in the second position (the right half position) to the first position (the left half position). When the line pressure $P_L$ serving as the source pressure is stopped, the biasing force of the spring 40s returns the spool 40p to the first position (the left half position). A simple configuration is thus achieved where the engagement pressure $P_{SL1}$ is input to the second control oil chamber 40g, and the signal pressure $P_{S1}$ is input as a lock release pressure to the first control oil chamber 40a. Therefore, when engine driving is stopped and the source pressure ($P_L$) also stopped, the biasing force of the spring 40s can return the spool 40p to the first position (the left half position). Consequently, a hydraulic circuit with a simple configuration can be achieved for a more compact hydraulic control device 20.

According to the present invention, as shown in FIGS. 5, 7, and 9, the hydraulic control device 20 includes: a parking switch valve 32 that is switched between a parking state in which the source pressure ($P_L$) is cut off from the parking cylinder 33 in the P range of a non-drive range and a parking release state in which the source pressure ($P_L$) is supplied to the parking cylinder 33 in a range other than the P range, and is held in the switched position; the second solenoid valve S2 (the non-release signal pressure output solenoid valve) that outputs to the parking switch valve 32 the signal pressure $P_{S2}$, which serves as a switch signal pressure that switches the parking release state to the parking state; and the first solenoid valve S1 (the release signal pressure output solenoid valve) that outputs to the parking switch valve 32 the signal pressure $P_{S1}$, which serves as a switch signal pressure that switches the parking state to the parking release state. The signal pressure $P_{S1}$ of the first solenoid valve S1 is also used in combination as the lock release pressure for the sorting switch valves 36, 38, and 40. Therefore, an exclusive solenoid valve for switching the sorting switch valves 36, 38, and 40 is not necessary. This further reduces the number of solenoid valves used in the hydraulic circuit, thus promoting simplification of the hydraulic circuit configuration.

In the present embodiment described above, an example was explained that applies the hydraulic control device 20 to the multi-speed automatic transmission 1, which is capable of eight forward speeds and one reverse speed. However, the present invention is obviously not limited to this. The present invention may be applied to any stepped automatic transmission, and is particularly suitable for application to an automatic transmission with several forward speeds.

The hydraulic control device for a multi-speed automatic transmission according to the present invention can be used in an automatic transmission mounted in a passenger vehicle, truck, bus, farm machinery, or the like, and is particularly well suited for use where shifting to a predetermined forward gear speed must not be made at least when an all-solenoids-off failure mode occurs while in the reverse range or a non-drive range.

[FIG. 2]
(O): ENGINE BRAKE IN USE
[FIG. 3]
OUTPUT
[FIGS. 4, 8, 10]
1/RANGE
2/ON/OFF SOLENOID
3/LINEAR SOLENOID
s
[FIGS. 5, 7, 9]
6/CONTROL UNIT
33/PARKING CYLINDER

What is claimed is:
1. A hydraulic control device for a multi-speed automatic transmission, comprising:
   a plurality of friction engagement elements;
   a plurality of hydraulic servos that engages and releases the plurality of friction engagement elements;
   a plurality of solenoid valves for engagement control that is at least one less than the plurality of hydraulic servos;
   a sorting switch valve that allocates an engagement pressure from at least one of the plurality of solenoid valves for engagement control to two among the plurality of hydraulic servos,
   wherein the sorting switch valve takes a first position that supplies the engagement pressure to one of the two hydraulic servos in at least a reverse range, a non-drive range, and a specific gear speed of a forward range, and takes a second position supplies the engagement pressure to another of the two hydraulic servos in other than the forward range, and
   the hydraulic control device achieves a first state that forms gear speeds using the solenoid valves for engagement control; a second state that supplies the engagement pressure to two among the plurality of hydraulic servos through two among the plurality of solenoid valves for engagement control when an all-solenoids-off failure occurs; and a third state that cuts off a source pressure to all the solenoid valves for engagement control when the all-solenoids-off failure occurs, wherein a state variable oil passage that passes through the sorting switch valve and modifies the second state and the third state depending on a pressure output state, the second state is achieved when the all-solenoids-off failure occurs while the sorting switch valve is in a second position, and the third state is achieved when the all-solenoids-off failure occurs while the sorting switch valve is in a first position.

2. The hydraulic control device for a multi-speed automatic transmission according to claim 1, further comprising:

a source pressure switch valve that switches between a supply position that supplies the source pressure to the plurality of solenoid valves for engagement control, and a reverse input position that inputs a reverse input pressure to exhaust ports of the two solenoid valves for engagement control through the sorting switch valve; and a signal pressure output solenoid valve that outputs a signal pressure, which switches the source pressure switch valve to the reverse input position when the all-solenoids-off failure occurs, wherein the state variable oil passage is formed from a reverse input oil passage that passes through the sorting switch valve from the source pressure switch valve, and communicates the reverse input pressure to the exhaust ports of the two solenoid valves for engagement control, and the sorting switch valve communicates with the reverse input oil passage when in the second position, and blocks the reverse input oil passage when in the first position.

3. The hydraulic control device for a multi-speed automatic transmission according to claim 1, further comprising:

a source pressure switch valve that switches between a supply position that supplies the source pressure to the plurality of solenoid valves for engagement control, and a cut-off position that cuts off the source pressure; and a signal pressure output solenoid valve that outputs a signal pressure that switches the source pressure switch valve to the cut-off position when the all-solenoids-off failure occurs, wherein the state variable oil passage is formed from a signal pressure passage that passes through the sorting switch valve from the signal pressure output solenoid valve and communicates the signal pressure to the source pressure switch valve, and the sorting switch valve blocks the signal pressure oil passage when in the second position, and communicates with the signal pressure oil passage when in the first position.

4. The hydraulic control device for a multi-speed automatic transmission according to claim 2, wherein the sorting switch valve includes a biasing mechanism that biases a spool so as to take the first position; a forward engagement pressure input oil chamber that is input with the engagement pressure, which is supplied to the hydraulic servo of the friction engagement element that is engaged during forward travel, and switches the spool to the second position against the biasing force of the biasing mechanism; a second lock pressure input oil chamber that is input with a lock pressure when in the second position to lock the spool in the second position; and a lock release pressure input oil chamber that is input with a lock release pressure that returns the spool locked in the second position to the first position, wherein when the source pressure is stopped, the biasing force of the biasing mechanism returns the spool to the first position.

5. The hydraulic control device for a multi-speed automatic transmission according to claim 1, further comprising:

a source pressure switch valve that switches between a supply position that supplies the source pressure to the plurality of solenoid valves for engagement control and a cut-off position that cuts off the source pressure, and has a first lock pressure input oil chamber that is input with a lock pressure to lock the source pressure switch valve to the supply position; and a signal pressure output solenoid valve that outputs a signal pressure, which switches the source pressure switch valve to the cut-off position when the all-solenoids-off failure occurs, wherein the sorting switch valve has a second lock pressure input oil chamber that is input with the lock pressure when in the second position to lock the sorting switch valve in the second position, the state variable oil passage is formed from a lock pressure oil passage that communicates the lock pressure to the first lock pressure input oil chamber of the source pressure switch valve through the second lock pressure input oil chamber of the sorting switch valve, and the sorting switch valve communicates with the lock pressure oil passage when in the second position, and blocks the lock pressure oil passage when in the first position.

6. The hydraulic control device for a multi-speed automatic transmission according to claim 5, wherein the sorting switch valve includes a biasing mechanism that biases a spool so as to take the first position; a forward engagement pressure input oil chamber that is input with the engagement pressure, which is supplied to the hydraulic servo of the friction engagement element that is engaged during forward travel, and switches the spool to the second position against the biasing force of the biasing mechanism; and a lock release pressure input oil chamber that is input with a lock release pressure that returns the spool locked in the second position to the first position, wherein when the source pressure is stopped, the biasing force of the biasing mechanism returns the spool to the first position.

7. The hydraulic control device for a multi-speed automatic transmission according to claim 4, further comprising:

a parking switch valve that is switched between a parking state in which the source pressure is cut off from a parking cylinder in a park range of the non-drive range, and a parking release state in which the source pressure is supplied to the parking cylinder in other than the park range, and is held in the switched position;

a non-release signal pressure output solenoid valve that outputs to the parking switch valve a switch signal pressure that switches the parking release state to the parking state; and a release signal pressure output solenoid valve that outputs to the parking switch valve a switch signal pressure that switches the parking state to the parking release state, wherein the signal pressure of the release signal pressure output solenoid valve is also used in combination as the lock release pressure for the sorting switch valve.

* * * * *